(12) United States Patent
Boutin et al.

(10) Patent No.: US 7,959,215 B2
(45) Date of Patent: Jun. 14, 2011

(54) SEMI-TRAILER

(75) Inventors: Bernard Boutin, Plessisville (CA); Jean-Robert Fontaine, Plessisville (CA); Dominique Marcoux, Victoriaville (CA); Julien Nadeau, St-Patrice de Beaurivage (CA); Elis Parent, Québec (CA)

(73) Assignee: Transnat Express Inc., Plessisville (Québec) (CA)

( * ) Notice: Subject to any disclaimer, the term of this patent is extended or adjusted under 35 U.S.C. 154(b) by 221 days.

(21) Appl. No.: 12/275,748

(22) Filed: Nov. 21, 2008

(65) Prior Publication Data

US 2010/0127523 A1    May 27, 2010

(51) Int. Cl.
*B60J 5/00*    (2006.01)
(52) U.S. Cl. ................................. 296/186.5; 296/182.1
(58) Field of Classification Search ............... 296/181.3, 296/181.7, 182.1, 183.1, 186.1, 186.4, 186.5; 296/191; 105/363, 370–372, 377.1, 378; 410/94
See application file for complete search history.

(56) References Cited

U.S. PATENT DOCUMENTS

| | | | |
|---|---|---|---|
| 3,037,807 A * | 6/1962 | Hicks | 296/10 |
| 3,155,419 A * | 11/1964 | Garson et al. | 296/186.4 |
| 3,205,002 A * | 9/1965 | Seng | 296/100.17 |
| 3,493,263 A * | 2/1970 | Brown | 296/186.1 |
| 3,836,769 A | 9/1974 | Wilson | |
| 4,099,640 A * | 7/1978 | Nessfield et al. | 220/6 |
| 4,350,382 A | 9/1982 | Spronck | |
| 4,475,761 A | 10/1984 | Milroy et al. | |
| 4,489,975 A | 12/1984 | Fredin | |
| 4,497,259 A | 2/1985 | Titterton | |
| 4,535,933 A | 8/1985 | Kuiper | |
| 4,613,182 A | 9/1986 | Stone | |
| 4,946,214 A | 8/1990 | Neumann et al. | |
| 5,026,112 A | 6/1991 | Rice | |
| 5,263,601 A * | 11/1993 | Borow | 220/6 |
| 5,595,414 A | 1/1997 | Dulnig et al. | |
| 5,599,058 A | 2/1997 | Carter et al. | |
| 5,711,566 A | 1/1998 | Lesmeister et al. | |
| 5,988,732 A | 11/1999 | Schouten | |
| 6,079,762 A | 6/2000 | Strasser | |
| 6,196,786 B1 * | 3/2001 | Shinohara | 414/498 |
| 6,382,731 B1 * | 5/2002 | Slutz et al. | 298/22 R |
| 6,877,794 B2 * | 4/2005 | Bush, Sr. | 296/186.2 |
| 7,118,158 B2 | 10/2006 | Schlipp | |
| 7,125,068 B2 | 10/2006 | Waldorf | |
| 2005/0127713 A1 | 6/2005 | Taylor | |
| 2010/0019536 A1 * | 1/2010 | Bloodworth et al. | 296/184.1 |

FOREIGN PATENT DOCUMENTS

EP        0192 559 B1    11/1988

\* cited by examiner

*Primary Examiner* — Lori L Lyjak
(74) *Attorney, Agent, or Firm* — Venable LLP; Robert Kinberg

(57) ABSTRACT

The invention generally concerns a semi-trailer to be trailed by a tractor. The semi-trailer comprises a wheeled deck having two lateral sides, proximate and distal longitudinal end sides. The semi-trailer also comprises two wall structures so pivotably mounted to the deck along a respective lateral side thereof as to be movable between an upright position, where the semi-trailer is in a dry-box configuration, and a lay down position wherein the semi-trailer is in a flatbed configuration. The two pivotable wall structures allow the semi-trailer to be moved between the dry-box configuration and the flatbed configuration.

35 Claims, 21 Drawing Sheets

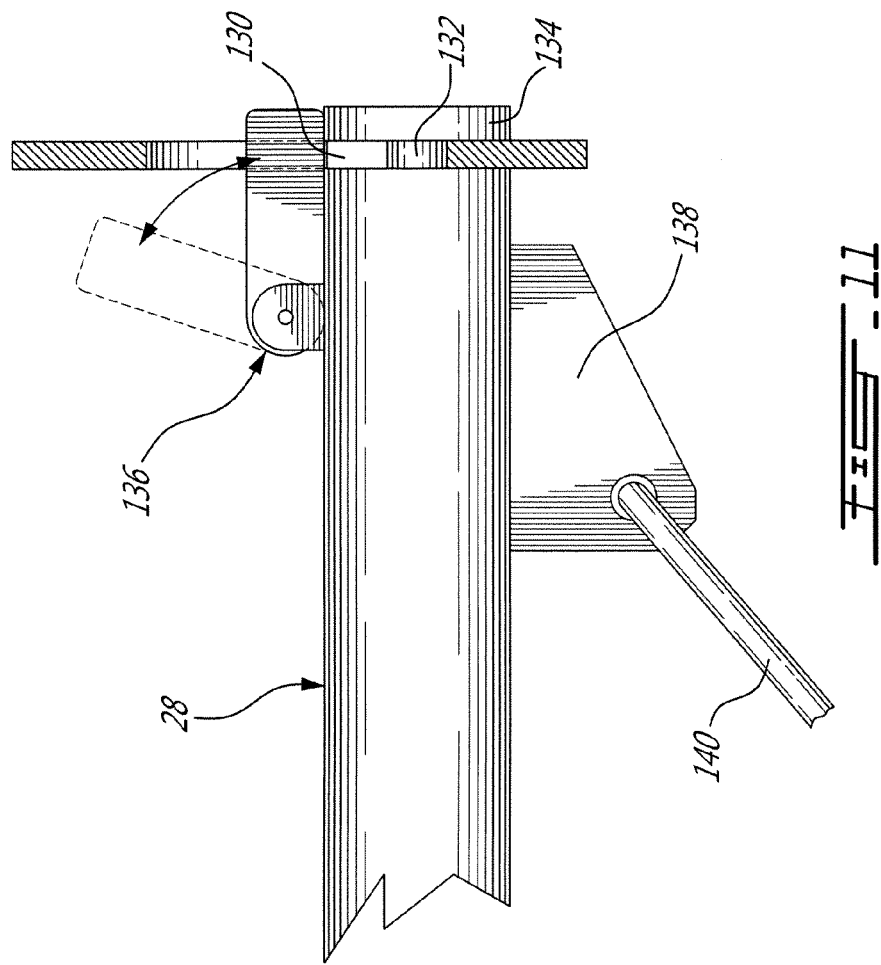
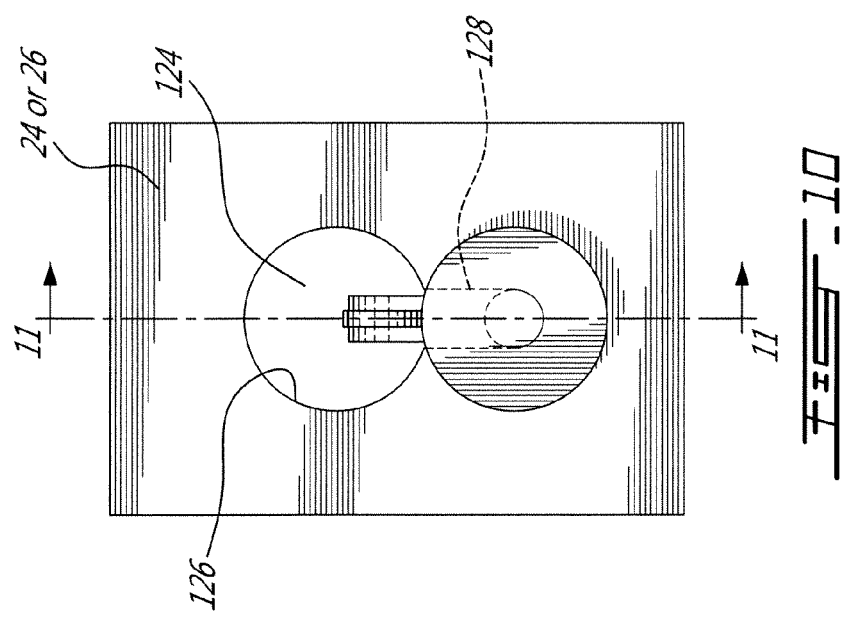

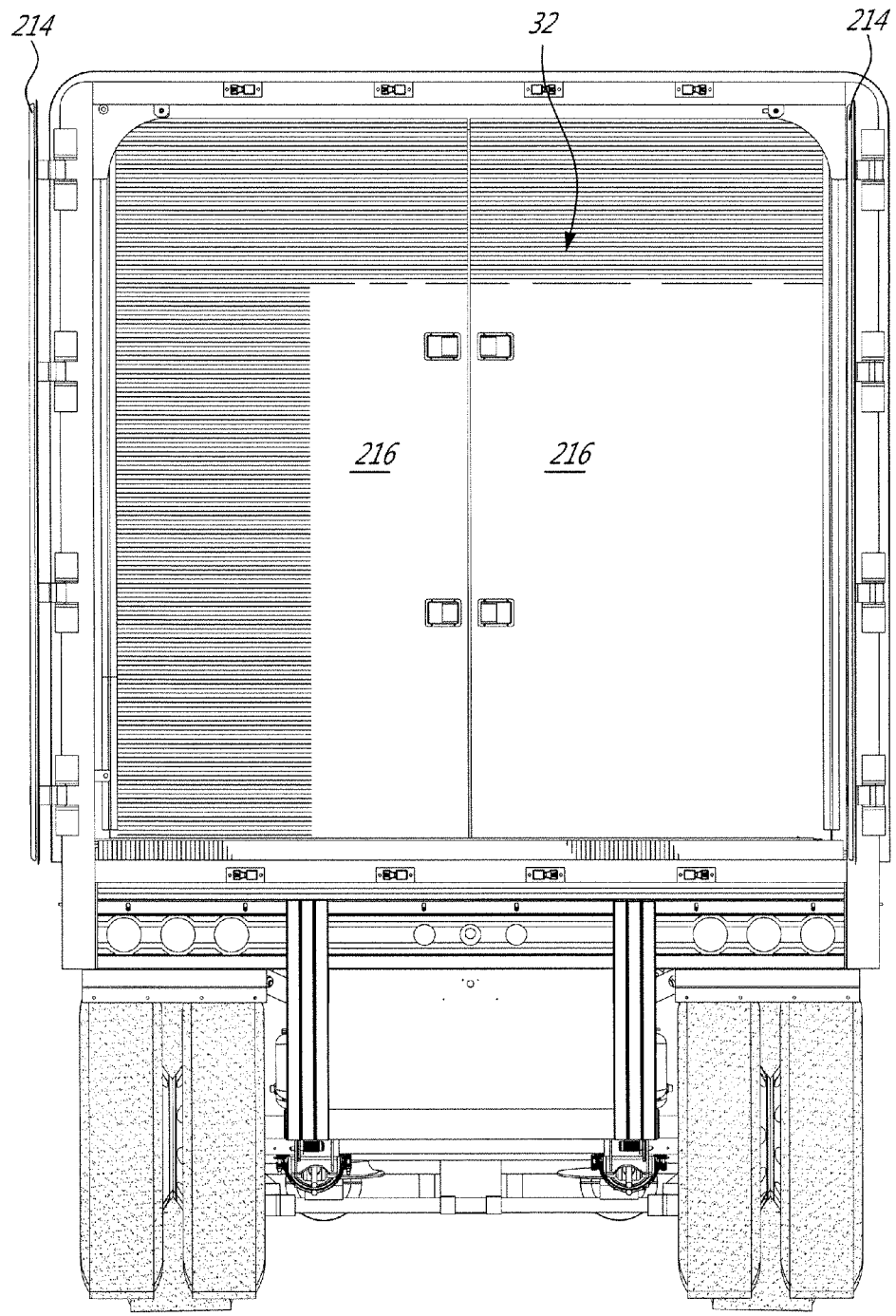

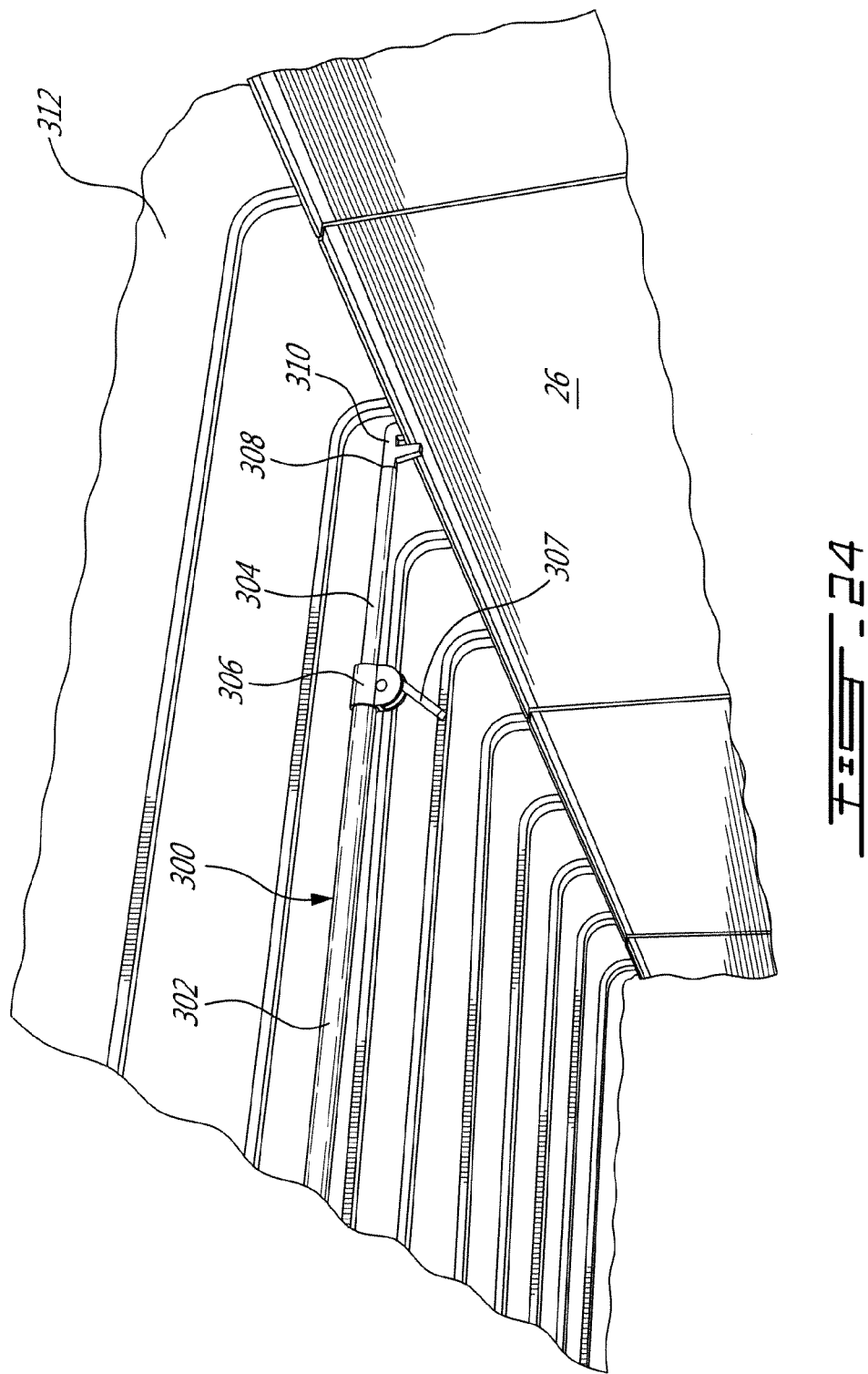

SEMI-TRAILER

BRIEF DESCRIPTION OF THE DRAWINGS

In the appended drawings:

FIG. 10 is a front view of an end of the removable wall-support assembly of FIG. 8 inserted in a receiving aperture of one of the side wall structure;

FIG. 11 is a sectional view taken along line 11-11 of FIG. 10;

FIG. 23 is a rear end view of the semi-trailer of FIG. 1 with both doors open; and FIG. 24 is a perspective view illustrating an alternate removable wall-support assembly.

Figure 1:
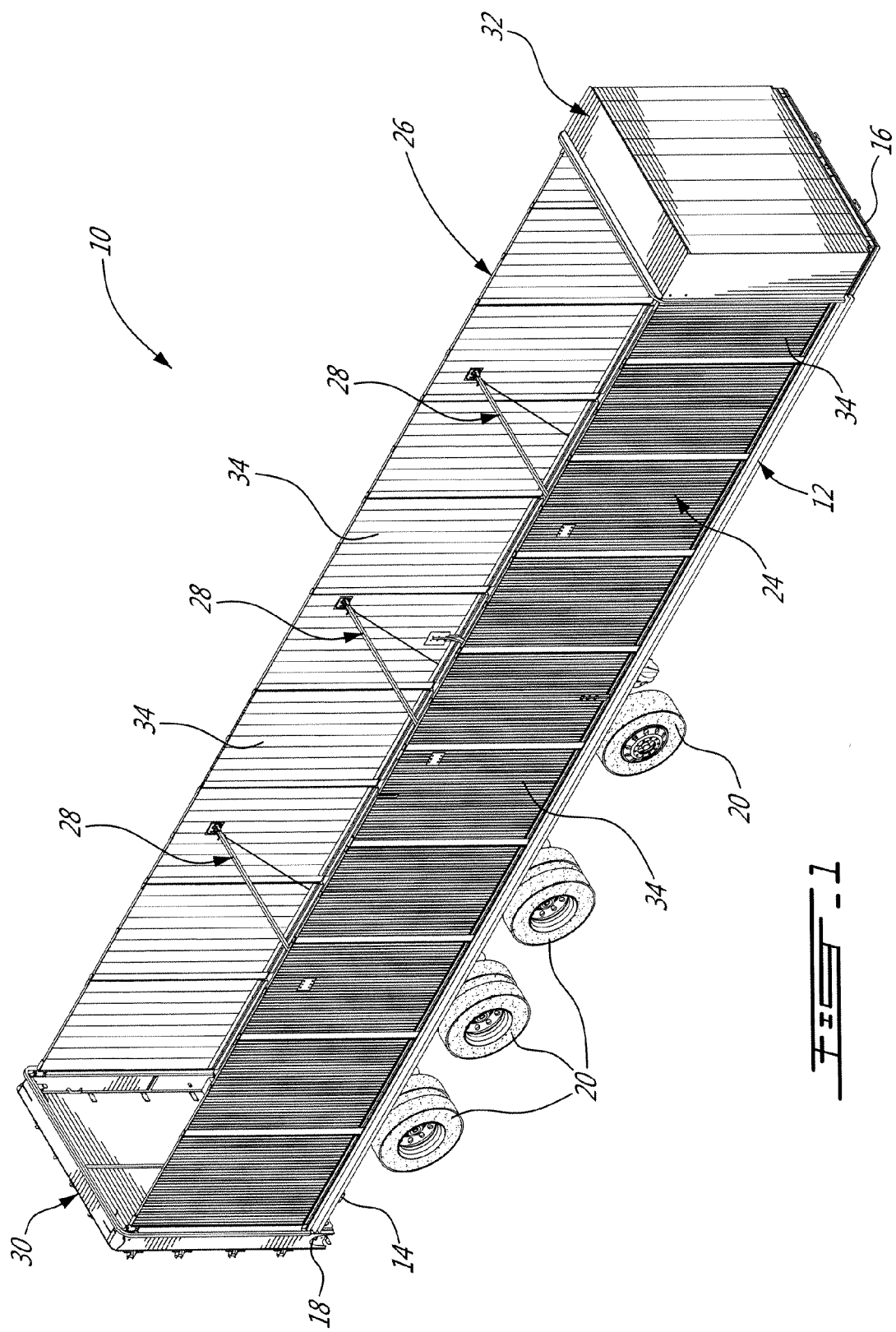
FIG. 1 is a perspective view of a semi-trailer provided with movable side wall structures according to an illustrative embodiment of the present invention, the semi-trailer being shown in a dry-box configuration.

While the invention will be described in conjunction with illustrated embodiments, it will be understood that it is not intended to limit the scope of the invention to such embodiments.

DETAILED DESCRIPTION

In the following description, similar features in the drawings have been given similar reference numerals, and in order not to weigh down the figures, some elements are not referred to in some figures if they were already identified in a precedent figure.

According to an illustrative embodiment of the invention, there is provided a semi-trailer to be trailed by a tractor. The semi-trailer comprises a wheeled deck having two lateral sides, proximate and distal longitudinal end sides. The semi-trailer also comprises two wall structures so pivotably mounted to the deck along a respective lateral side thereof as to be movable between an upright position, where the semi-trailer is in a dry-box configuration, and a lay down position wherein the semi-trailer is in a flatbed configuration. The two pivotable wall structures allow the semi-trailer to be moved between the dry-box configuration and the flatbed configuration.

It is to be noted that the expression "semi-trailer" is to be construed herein and in the appended claims as any transporting vessels, including conventional semi-trailers, which can be trailed on any type of road, including, for example, conventional highways and tracks.

It is to be noted that the expression "tractor" is to be construed herein and in the appended claims as any vehicle that is adequate to trail a semi-trailer.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

An embodiment of a semi-trailer 10 is illustrated in FIG. 1.

The semi-trailer 10 comprises a wheeled deck 12 having two lateral sides 14, proximate and distal longitudinal ends, in the form of front and rear ends 16 and 18, and being mounted on wheels 20 so as to be trailed by a tractor (not shown).

As a person skilled in the art would know, the deck 12 further includes powered axles 22 (only one shown; see FIG. 5), brake systems (not shown), a semi-trailer kingpin (not shown), a landing gear 23 (FIG. 19) and other various systems required in the operation of a semi-trailer.

The semi-trailer 10 further includes two wall structures 24 and 26 so pivotably mounted to the deck 12 along a respective lateral side 14 thereof as to be movable between an upright position (see FIG. 1), wherein the semi-trailer is in a dry-box configuration, and a lay down position (see FIG. 2), wherein the semi-trailer 10 is in a flatbed configuration.

The semi-trailer 10 also comprises removable wall-support assemblies 28, only partially shown in FIG. 1, a rear door assembly 30 mounted to the rear end 18 of the deck 12 and a storage compartment 32, mounted to the front end 16 of the deck 12.

The wall structures 24 and 26 and their mounting to the deck 12 will now be described with reference to FIGS. 1 to 5.

Figure 2:
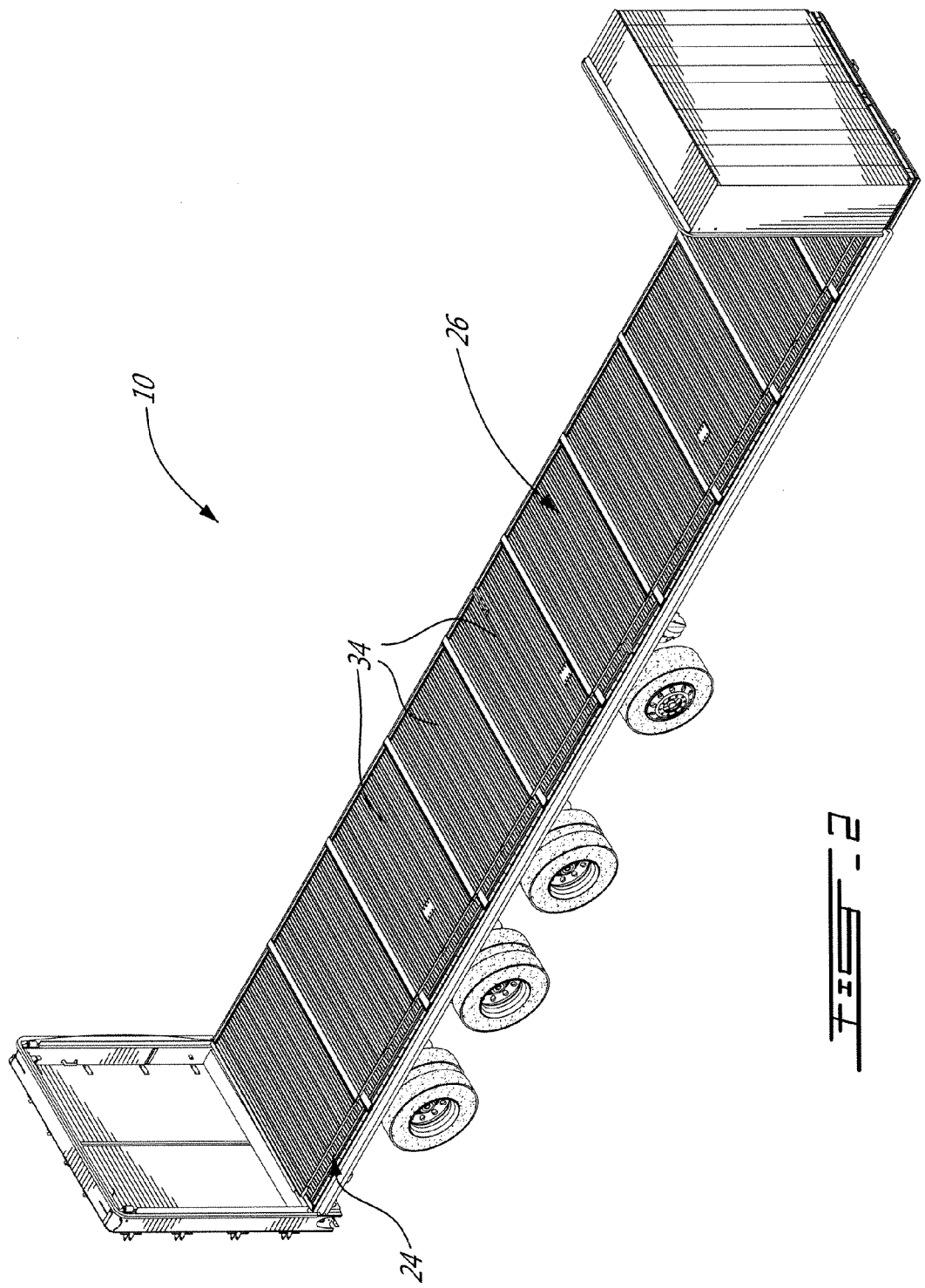
FIG. 2 is a perspective view of the semi-trailer of FIG. 1, the semi-trailer being shown in a flat bed configuration.

As can be seen from FIGS. 1 and 2, each of the wall structures 24 and 26 is made of a series of adjacent wall panels 34 mounted together side by side using side beams 36 and 38 (FIG. 3) providing tongue and groove cooperating arrangement.

According to further non-illustrated embodiments, the wall structures 24 and 26 can each be made of single panels or be the result of other types of assembly such as without limitations, panels inserted in a U-shaped channel provided at the bottom of such wall structure, or adjacent panels secured side-by-side using mounting brackets or other types of fasteners.

Figure 3:
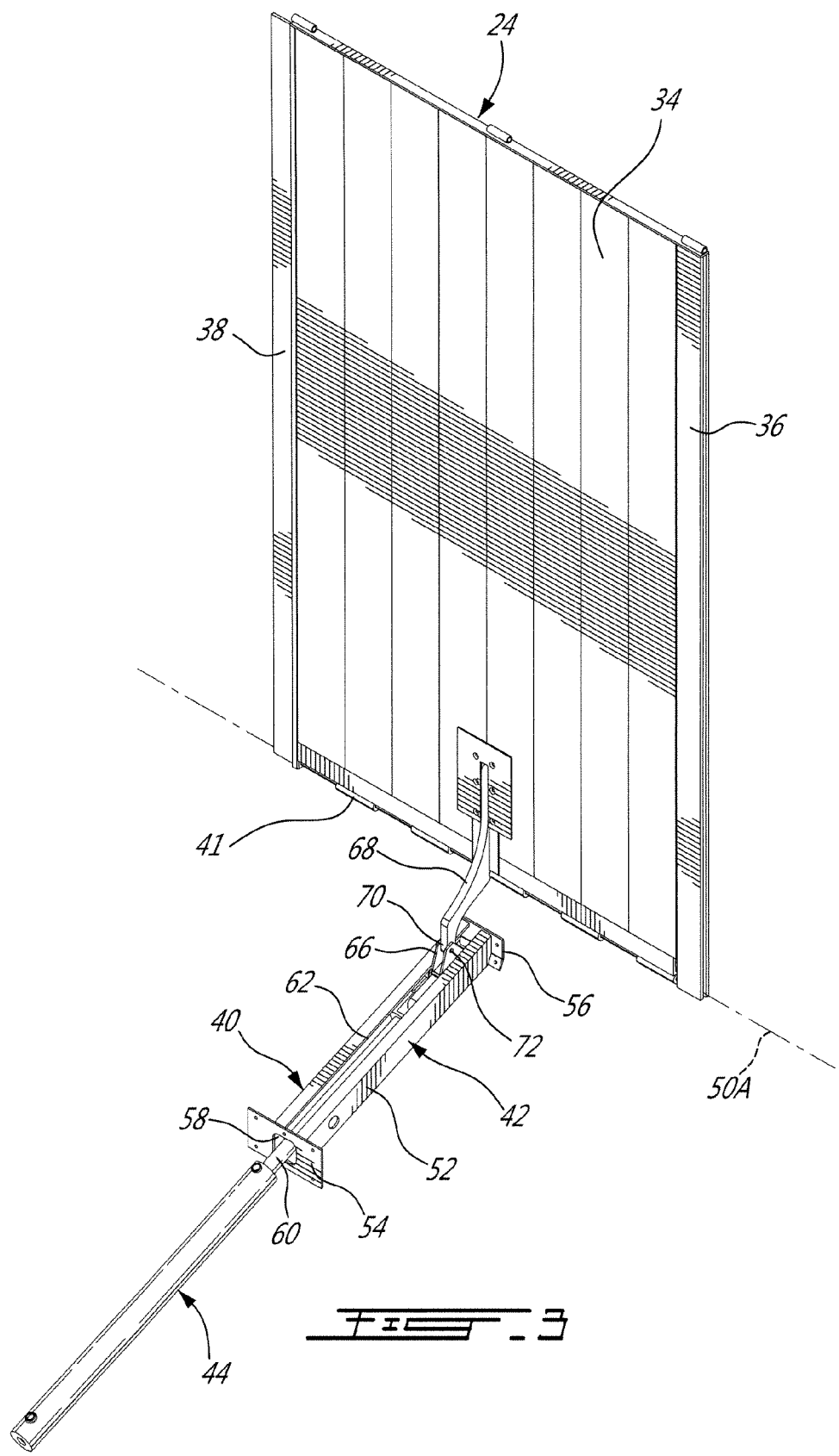
FIG. 3 is a perspective view of a portion of a side wall structure.
Figure 4:
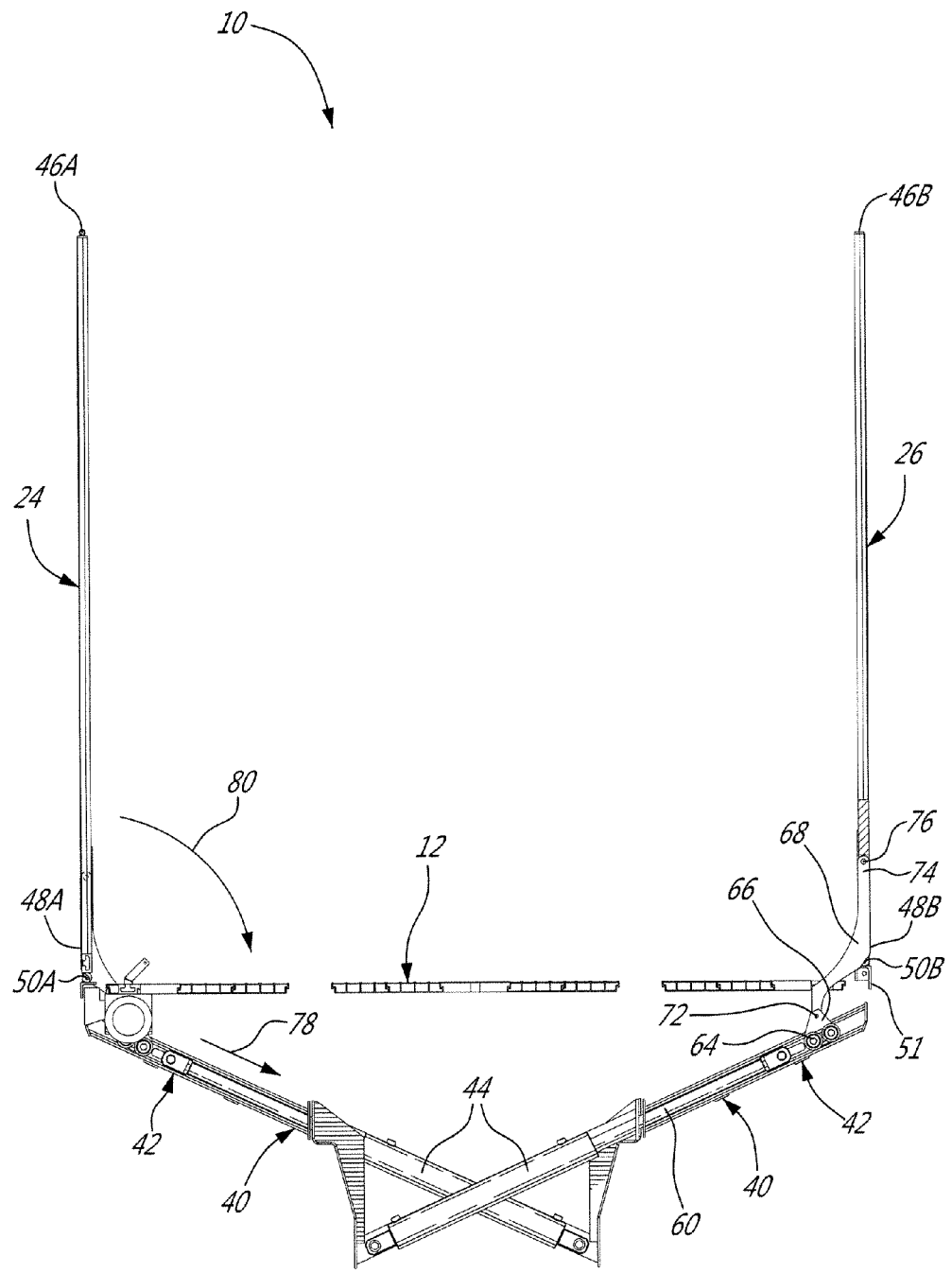
FIG. 4 is a sectional front elevational view of a portion of the semi-trailer in the dry-box configuration.
Figure 5:
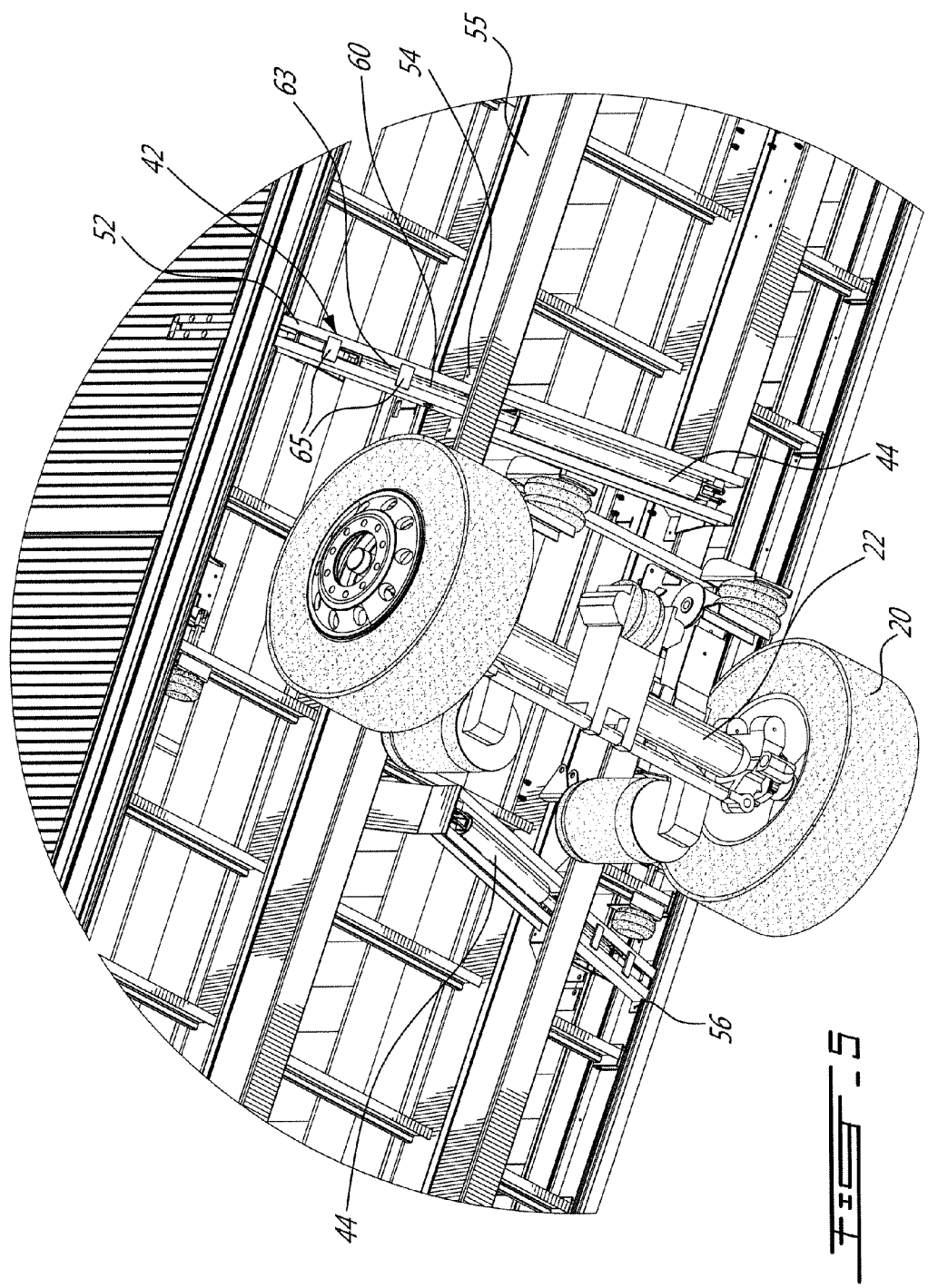
FIG. 5 is a perspective view of a portion of the underside of the semi-trailer of FIG. 1.

With reference to FIGS. 3 to 5, each of the wall structures 24 and 26 is pivotably mounted to a respective lateral side 14 of the deck 12 via a wall pivoting mechanism 40 according to a first embodiment. Hinges are also provided between each of the wall structures 24 and 26 and a respective lateral side 14. FIG. 3 illustrates a portion 41 of these hinges.

Each wall pivoting mechanism 40, which define means for pivoting the two wall structures, includes a wall mounting assembly 42 and an actuator 44 for selectively causing the wall structure 24 or 26 to pivot between the upright and lay-down positions.

More specifically, as can be seen from FIG. 4, the wall structure 24 has top and bottom sides 46A and 48A and is mounted to the deck 12 so that it can pivot about a pivot axis 50A towards the deck 12. The wall structure 26 similarly has top and bottom sides 46B and 48B and is mounted to the deck 12 so that it can pivot about a pivot axis 50B towards the deck 12.

As can be seen from FIG. 4, the pivot axis 50B is so mounted to a bracket 51 that it is higher than the pivot axis 50A. This height difference between the two pivot axes 50A and 50B allows the wall structure 26 to overlap the wall structure 24 when both wall structures 24 and 26 are in their lay-down position.

Returning to FIGS. 3 and 4, each wall mounting assembly 42 includes a hollow rectangular tube 52 provided with brackets 54 and 56, a passage aperture 58 in the bracket 54 to allow the piston 60 of the actuator 44 therethrough and longitudinal top and bottom apertures 62, 63. As can be better seen from FIG. 4, the wall mounting assembly 42 also includes a wheeled base 64 mounted to the end of the piston 60 of the actuator 44 and configured and sized to be longitudinally movable in the rectangular tube 52. The wheeled base 64 includes a bracket 66 protruding from the tube 52 via the top aperture 62.

As can be seen from FIG. 5, the wheeled base 64 also includes projections 65 passing through the bottom aperture 63 to securely mount the base 64 to the tube 52.

FIG. 5 also illustrates the mounting of the bracket 54 to a frame 55 of the semi-trailer 10. The bracket 56 is also mounted to the frame 55.

Returning to FIG. 3, the wall mounting assembly 42 also includes a curved connecting element 68 provided with a first end 70 that is pivotally mounted to the bracket 66 via a pivot pin 72. As can be better seen from FIG. 4, the connecting element 68 also includes a second end 74 pivotally mounted to the wall structure 24 via a pivot pin 76.

The operation of the wall pivoting mechanism 40 will now be briefly described with reference to FIG. 4. When the semi-trailer 10 is in the dry-box configuration of FIG. 1, the actuator 44 is in an extended position. Then the actuator 44 is controlled so as to retract the piston 60 (see arrow 78), causing the wheeled base 64 to be pulled along the piston 60. This longitudinal movement of the wheeled base 64 in the tube 52 pulls the connecting element 68 that therefore pivots about both pivot pins 72 and 76. This, in turn, forces the connected wall structure 24 or 26 to pivot about its own pivot axis 50A or 50B (see arrow 80). Eventually, the wall structure rests parallel to the deck 12.

As will be understood by one skilled in the art, the configuration of the connecting element 68 and the angle of the hollow tube in which the wheeled base 64 moves allow a smooth pivoting movement of the wall structure.

Figure 6:
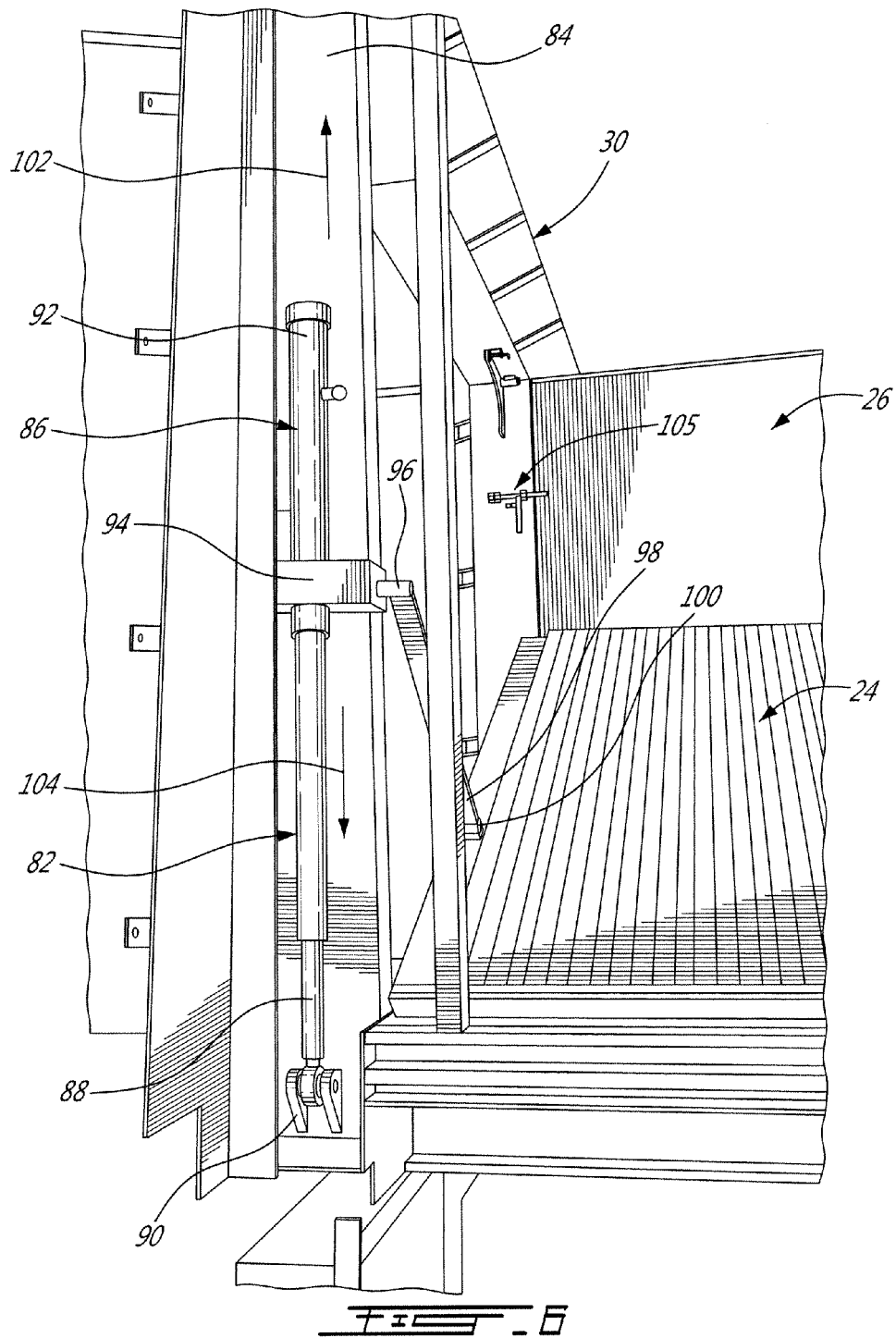
FIG. 6 is a perspective view illustrating the rear end of the semi-trailer of FIG. 1, with the side wall structure positioned between the dry-box and the flat-bed configurations.

Turning now to FIG. 6 of the appended drawings, an end wall pivoting mechanism 82, which define means for pivoting the two wall structures, will be described.

The end wall pivoting mechanism 82 is mounted to a side post 84 of the rear door assembly 30. The mechanism 82 includes an actuator in the form of a pneumatic cylinder 86 provided with a piston 88 pivotally mounted to the side post 84 via a bracket 90. The body 92 of the actuator 86 is provided with a bracket 94 to which the proximate end 96 of a link arm 98 is pivotally mounted. The distal end 100 of the arm 96 is pivotally mounted to the wall structure 24.

Accordingly, when the actuator 86 is so controlled as to extend its piston 88, the bracket 94 is moved in the direction of arrow 102, i.e. in a direction generally perpendicular to the wheeled deck 12, and the proximate end 96 of the arm 98 is pulled in the direction of arrow 102, raising the wall structure 24 towards its upright position. Conversely, when the actuator 86 is so controlled as to retract its piston 88, the bracket 94 is moved in the direction of arrow 104 and the proximate end 96 of the arm 98 is pulled in the direction of arrow 104, lowering the wall structure 24 towards its lay down position.

It is to be noted that even though only one end wall pivoting mechanism 82 is shown in the appended drawings, such an assembly can be provided at both longitudinal ends of each wall structure 24 and 26. It will also be noted that the end wall pivoting mechanism associated with the front end of the semi-trailer 10 use the storage compartment 30 as a perpendicular surface to the wheeled deck 12 to mount the actuator and the associated bracket.

FIG. 6 also illustrates a sliding bolt assembly 105 used to releasably lock the wall structure 26 to the rear door assembly 30. Again, even though only one sliding bolt assembly 105 is shown in the appended drawings, such an assembly can be provided at both longitudinal ends of each wall structure 24 and 26.

Figure 7:
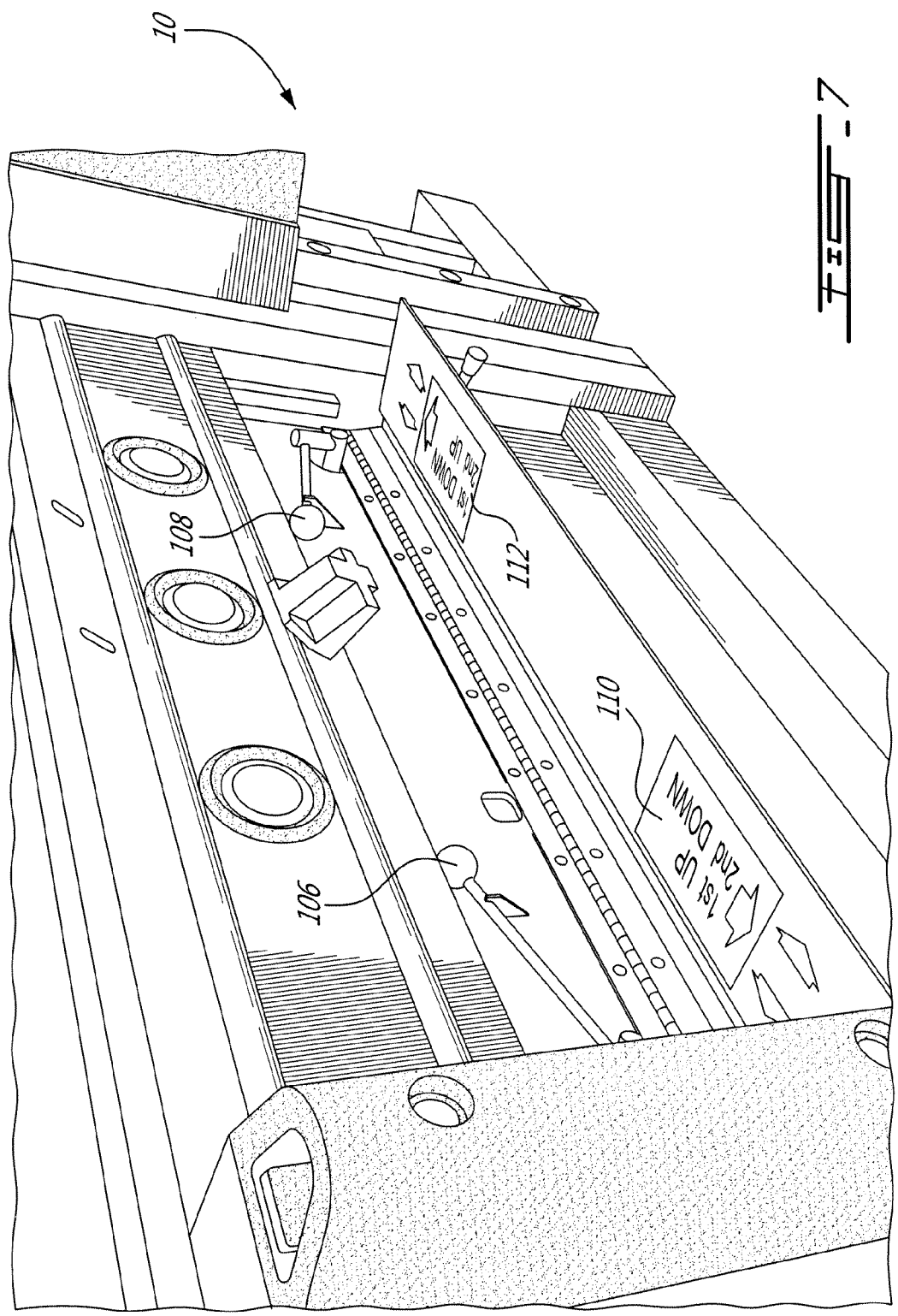
FIG. 7 is a perspective view illustrating the rear end of the semi-trailer of FIG. 1 showing the pneumatic controls of the movable side wall structures.
Figure 8:
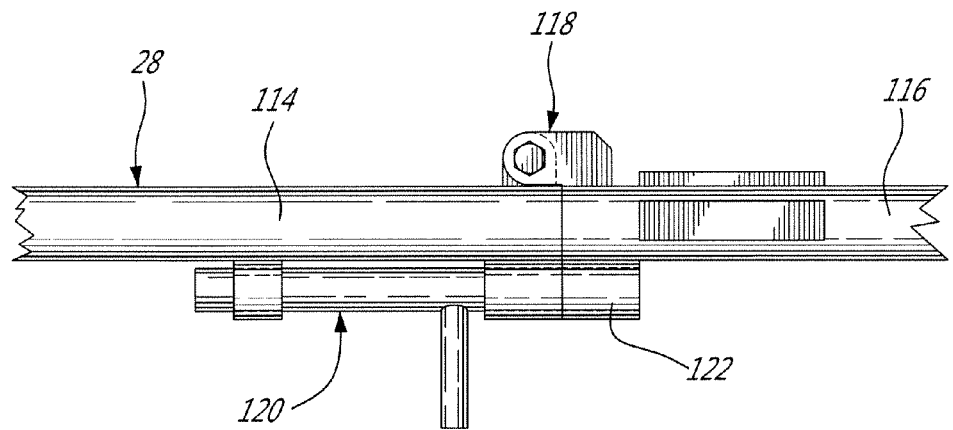
FIG. 8 is a side elevational view of a portion of a removable wall-support assembly, shown in extended and locked position.

FIG. 7 of the appended drawings illustrates the rear of the semi-trailer 10 where the controls for the wall pivoting mechanisms 40 and for the end wall pivoting mechanisms 82 are located. A first lever 106 controls the mechanisms 40 and 82 associated with the wall structure 26 while a second lever 108 controls the mechanisms 40 and 82 associated with the wall structure 24. Accordingly, labels 110 and 112 are provided to indicate the pivoting order of the wall structures 24 and 26.

Figure 9:
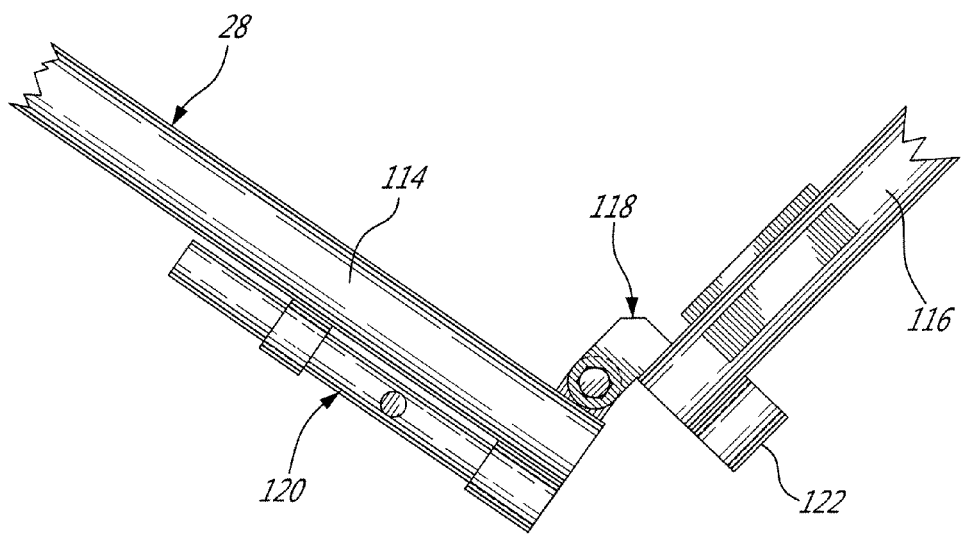
FIG. 9 is a side elevational view of a portion of the removable wall-support assembly of FIG. 8, shown in a folded position.

Turning now to FIGS. 8 to 11, a wall-support assembly 28 will be described. The wall support assembly 28 includes a first bar 114 and a second bar 116 interconnected by a pivot assembly 118. A locking assembly including a slide bolt 120 mounted to the bar 114 and a bolt receiver 122 mounted to the bar 116 is also provided. Accordingly, when the slide bolt 120 is inserted in the receiver 122, the wall-support assembly 28 is locked in the extended position of FIG. 8. However, when the slide bolt 120 is not inserted in the receiver 122, the wall-support assembly 28 can be folded as illustrated in FIG. 9 for the installation or the removal of the wall support assembly 28 to or from the wall structures 24 and 26.

As can be seen from FIG. 10, the wall structures 24 and 26 include keyhole apertures 124 provided with a circular portion 126 and a narrow neck portion 128. Each end of the wall-support assembly 28 is provided with a circumferential channel 130 defining a neck portion 132 configured to enter the neck portion 128 of the keyhole aperture 124 and a head portion 134 configured to enter the circular portion 126 of the keyhole aperture 124. The end of the wall-support assembly 28 is also provided with a pivoting lock 136.

Accordingly, when the head portion 134 enters the circular portion 126 so that the neck portion 132 can enter the neck portion 128 of the keyhole aperture 124 via a downward movement, the wall-support assembly 28 is prevented from being removed therefrom by a straight pulling action. By pivoting the lock 136 in the position shown in full lines in FIG. 11, removal of the wall-support assembly 28 from the keyhole aperture 124 is prevented.

FIG. 11 also illustrates a bracket 138 mounted to each end of the wall-support assembly 28 to provide anchorage to strengthening cables 140 that form a part of the wall-support assembly 28.

Figure 12:
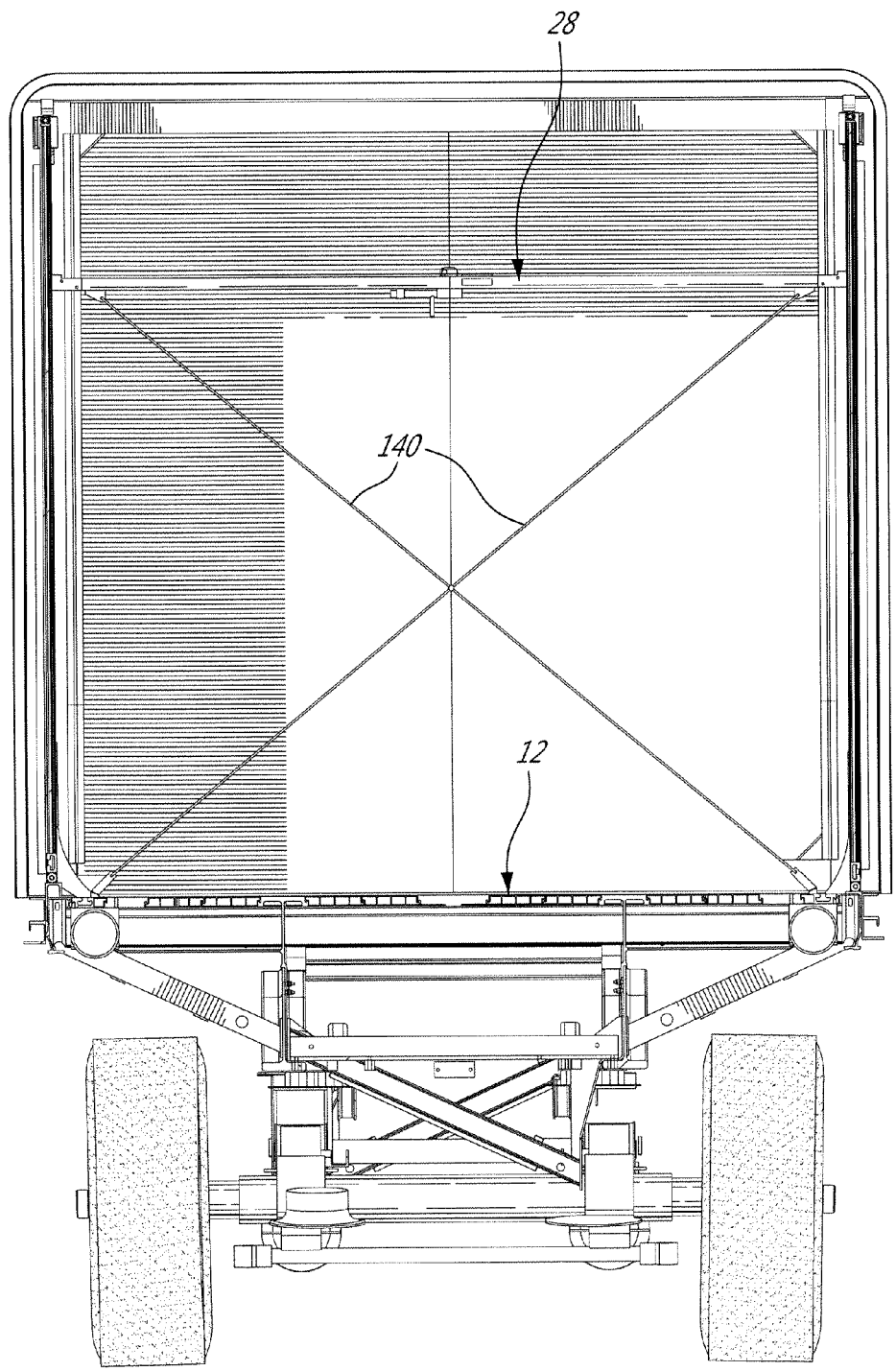
FIG. 12 is a rear end view of the semi-trailer of FIG. 1, illustrating a removable wall-support assembly provided with strengthening cables.

FIG. 12 illustrate two strengthening cables 140 each having a first end mounted to a respective end of the wall-support assembly 28 and a second end secured to the wheeled deck 12 so as to form an X-brace.

Figure 13:
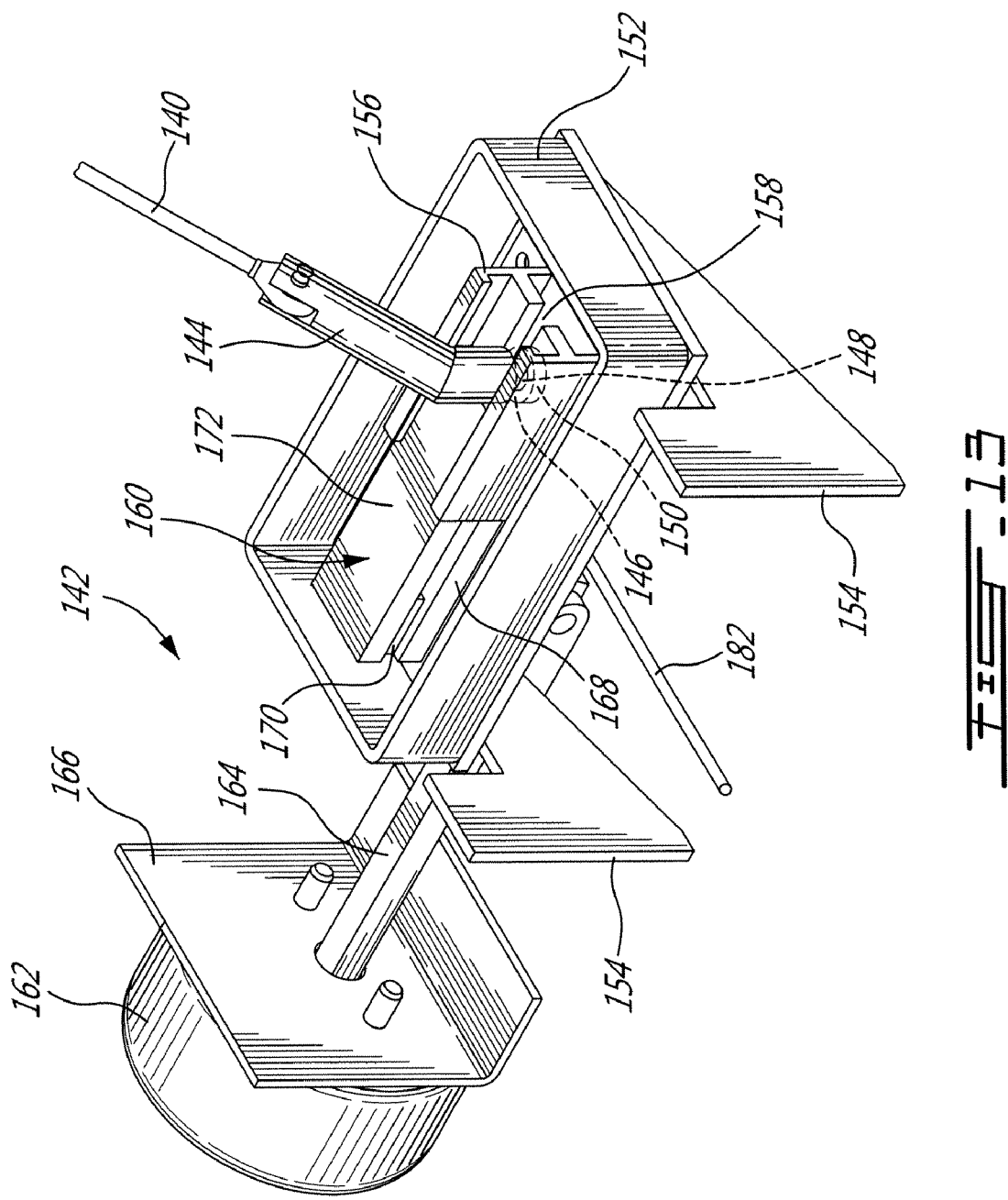
FIG. 13 is a perspective view of a strengthening cable power releasing mechanism.
Figure 14:
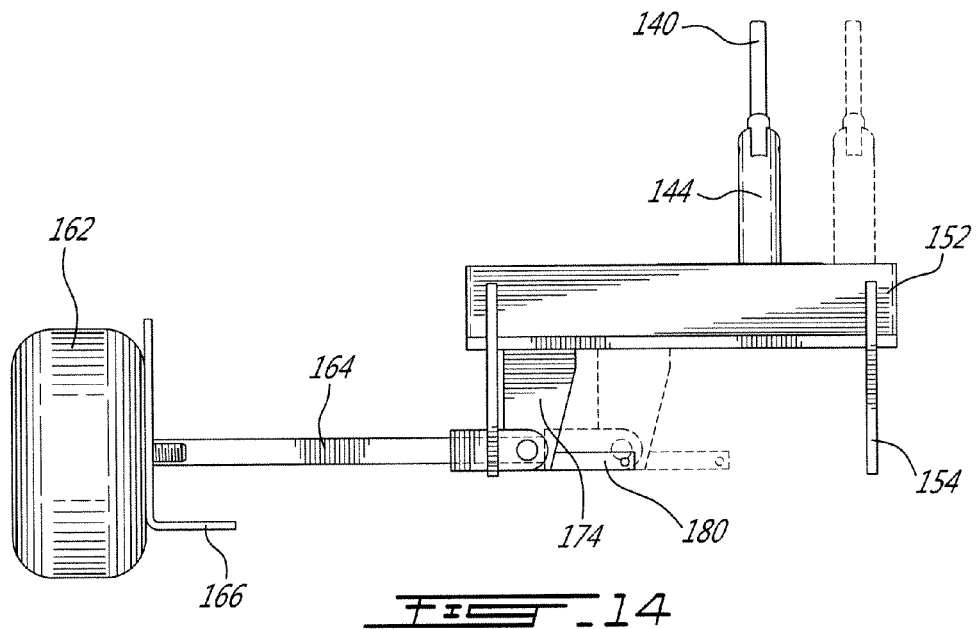
FIG. 14 is a side elevational view of the power releasing mechanism of FIG. 13.
Figure 15:
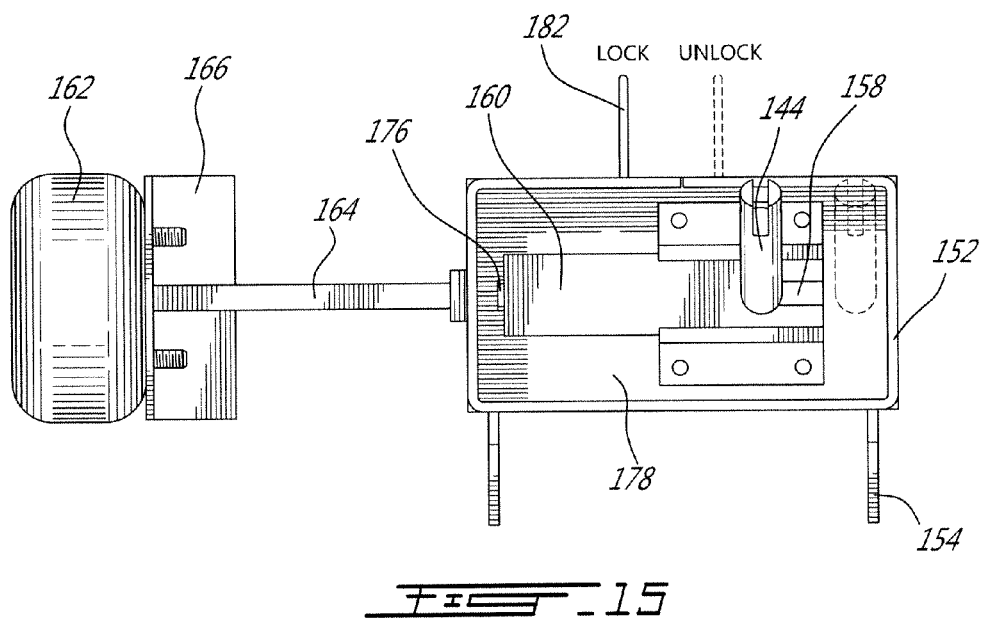
FIG. 15 is a top plan view of the power releasing mechanism of FIG. 13.

Turning now to FIGS. 13 to 15, the strengthening cable power releasing mechanism 142 used to anchor one cable 140 to the wheeled deck 12 and to remotely release the cable on command will now be described. It is to be noted that even though only one mechanism 142 will be described hereinbelow, such a mechanism is provided for each cable 140.

As can be seen from FIG. 13, the end of the cable 140 is mounted to an angled adaptor 144, the end of which is provided with a circumferential channel 146 defining a relatively narrow neck portion 148 and a wider head portion 150.

The cable power releasing mechanism 142 includes a body 152 mounted to the deck 12 via brackets 154, a generally H-shaped cable retainer 156 provided with a narrow channel 158, a cable pushing assembly 160 and an actuator in the form of a pneumatic cylinder 162 provided with a push rod 164 and mounted to the deck 12 via a bracket 166.

The H-shaped cable retainer 156 is so configured that the neck portion 148 of the adaptor 144 can enter the channel 158 by the illustrated open end of the cable retainer 156.

The cable pushing assembly 160 includes a low pushing plate 168, a spacer 170 and a high pushing plate 172. The low pushing plate 168 is positioned under the channel 158 while the high pushing plate 172 is positioned over the channel 158, thanks to the spacer 170.

As can be better seen from FIG. 14, the cable pushing assembly 160 also includes a bracket 174 projecting under the body 152 and secured to the push rod 164. The bracket 174 extends through a channel 176 (see FIG. 15) provided in the base 178 of the body 152. The bracket 174 also includes a projection 180 to which a visual locking indicator 182 is mounted.

In operation, when the cable pushing assembly 160 is in the position illustrated in full lines, the adaptor 144 may be inserted in the H-shaped cable retainer 156 via the free end thereof to adequately secure the cable to the deck 12 against straight pulling actions.

When the cable pushing assembly 160 is pushed to its position illustrated in dashed lined in the figures by the push rod 164 under the control of the cylinder 162, the adaptor 144 is pushed out of the channel 158 to thereby release the cable 140 therefrom.

Figure 16:
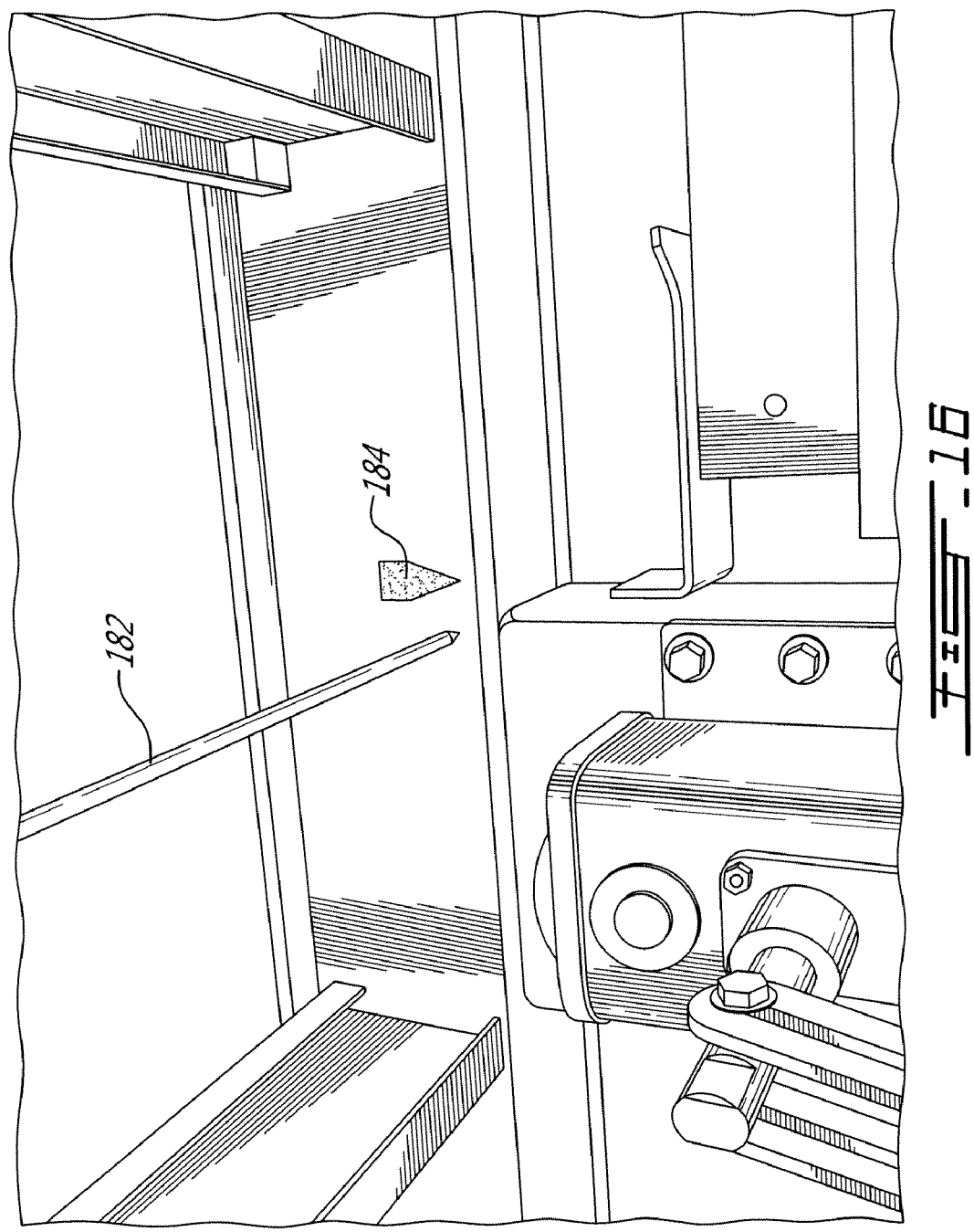
FIG. 16 is an underside view of a portion of the semi-trailer of FIG. 1 illustrating the pointing element of the power releasing mechanism of FIG. 13.

FIG. 16 illustrates a portion of the underside of the deck 12 where the visual locking indicator 182 may be viewed by a user. The alignment of the indicator 182 with a mark 184 indicates to the user that the adaptor 144 is locked in the strengthening cable power releasing mechanism 142.

One skilled in the art will understand that the cable power releasing mechanism 142 described hereinabove may remotely release the cable 140 even when the semi-trailer is loaded to prevent obstructions to the unloading process by the cables 140.

Figure 17:
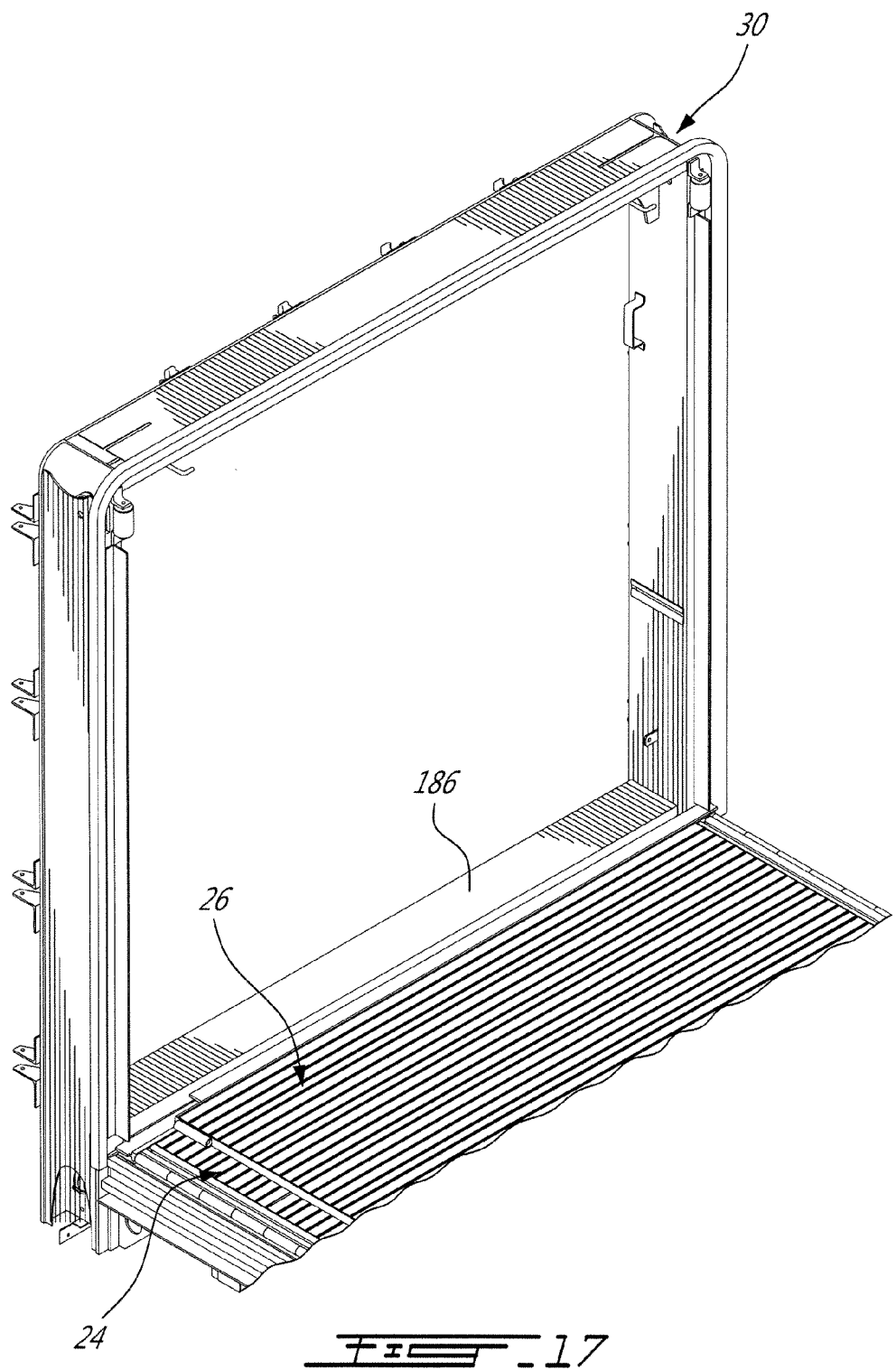
FIG. 17 is a perspective view illustrating the rear end of the semi-trailer of FIG. 1.
Figure 18:
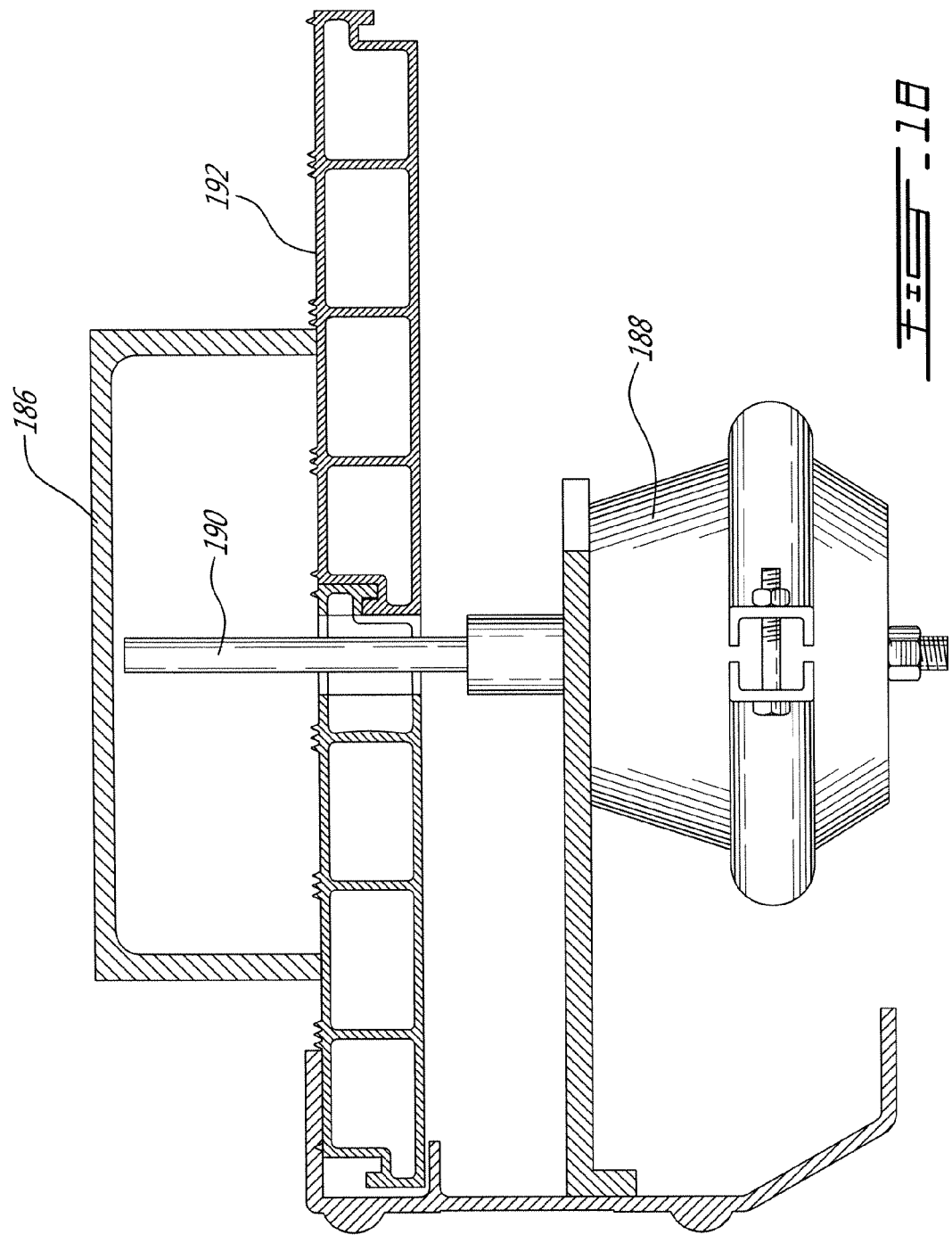
FIG. 18 is a sectional side elevational view of a portion of the rear end of the semi-trailer of FIG. 1 illustrating the step releasing mechanism.

Turning now to FIGS. 17 and 18 a removable step 186 will be described. The purpose of the removable step 186 is to ensure that the doorstep of the rear doors of the semi-trailer is even with the wall structure 26 when in the lay-down position of FIG. 17.

As can be seen from FIG. 18, the removable step 186 has a generally inverted U-shaped profile.

An actuator in the form of a pneumatic cylinder 188 provided with a push rod 190 is mounted to the deck 12 to help the removal of the step 186 from the doorstep 192, for example in freezing conditions.

When not in use, for example when the semi-trailer 10 is in a dry-box configuration, the step 186 can be stored in a rack mounted to the deck 12 thereunder.

Figure 19:
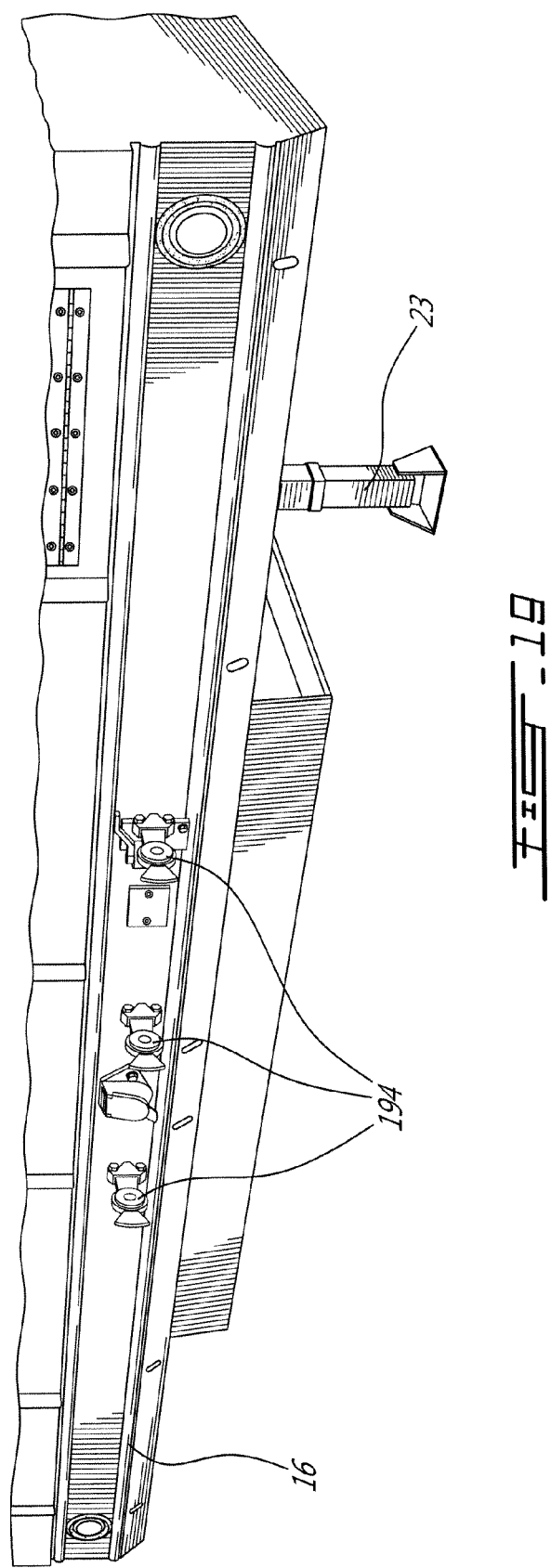
FIG. 19 is a perspective view of a portion of the front end of the semi-trailer of FIG. 1 illustrating the pneumatic inputs.

FIG. 19 illustrates the front end 16 of the semi-trailer 10 which is provided with pneumatic inlets 194.

Figure 20:
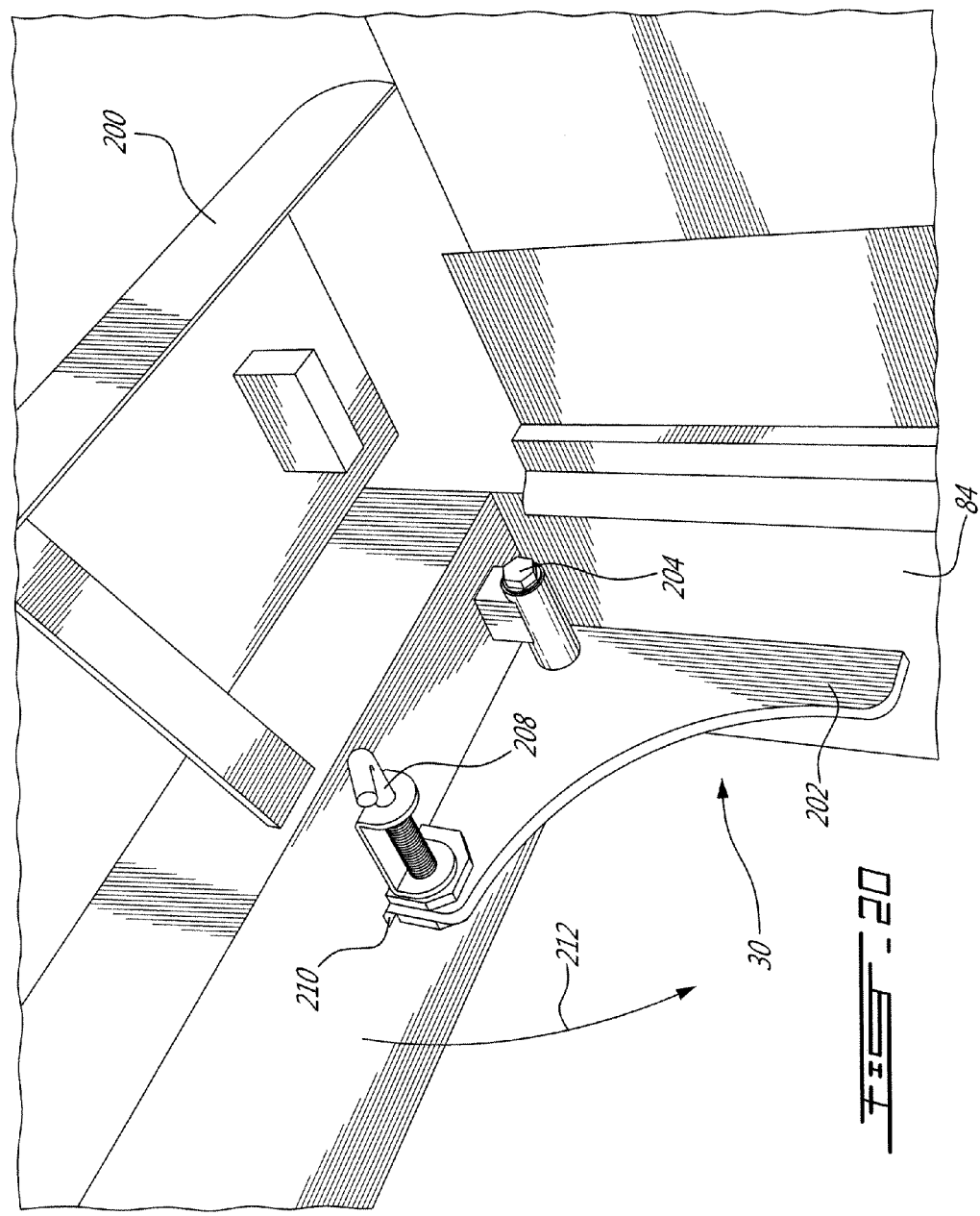
FIG. 20 is a perspective view of a top portion of the rear end of the semi-trailer of FIG. 1, showing the pivotable top portion of the rear end in a closed position.
Figure 21:
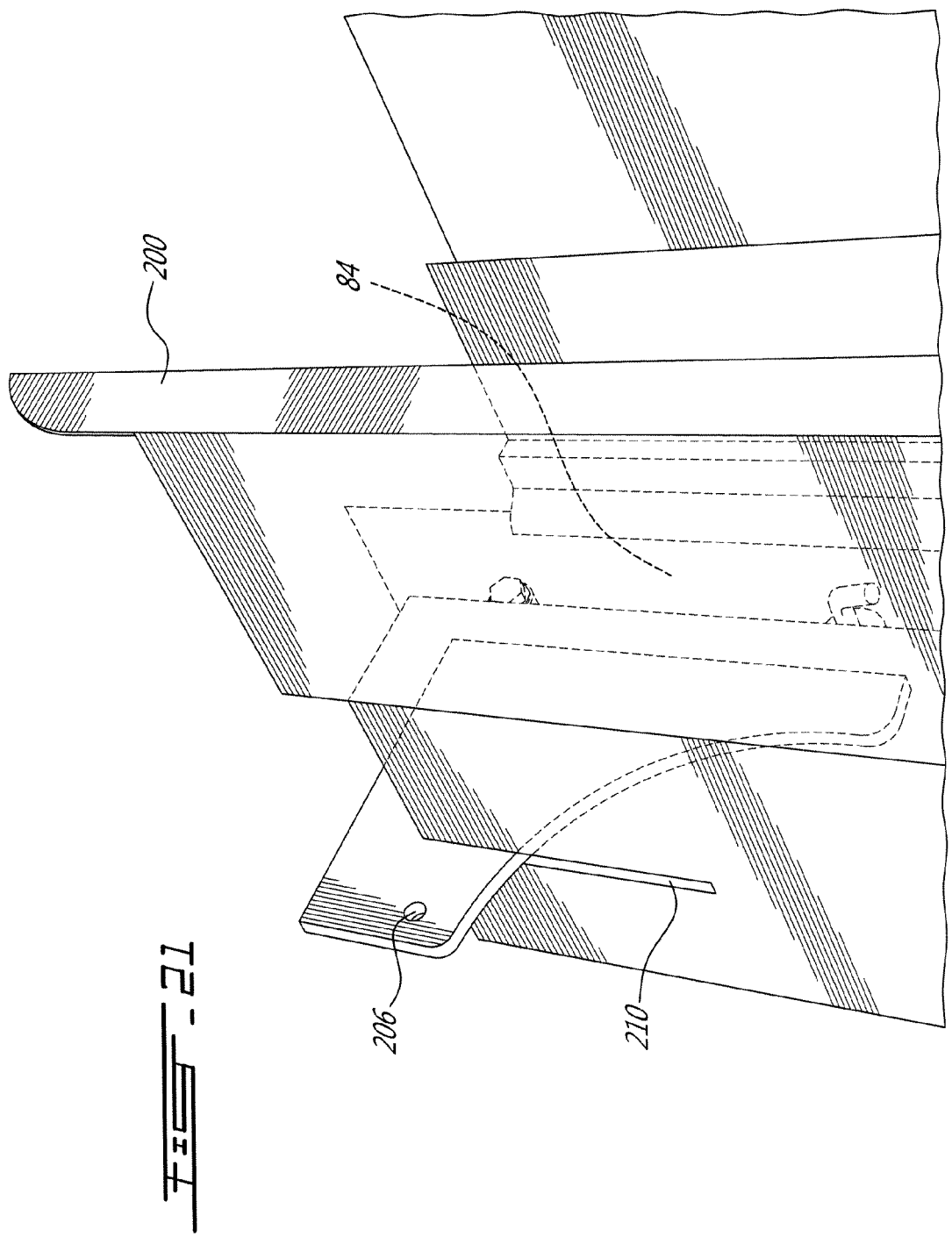
FIG. 21 is a perspective view of the top portion of FIG. 20, shown in an open position.

Turning now to FIGS. 20 and 21 of the appended drawings, the removable archway 200 of the rear door assembly 30 will be described.

A bracket 202 is mounted to a side post 84 of the rear door assembly 30 and include an aperture (not shown) to receive a bolt 204 that defines a pivot axis of the archway 200. The bracket 202 also includes a second aperture 206 (FIG. 21) configured to receive a spring loaded locking pin 208 which is part of the archway 200.

The archway 200 includes a channel 210 allowing the bracket 202 therethrough.

Accordingly, when the pin 208 is inserted in the aperture 206, the archway 200 is maintained in its locked and generally horizontal position illustrated in FIG. 20. When the pin 208 is manually pulled from the aperture 206, the archway 200 is free to be pivoted (see arrow 212) to place the archway 200 generally parallel to the side post 84 as illustrated in FIG. 21.

One skilled in the art will understand that the removal of the archway 200 may be required to load and/or upload large objects from the semi-trailer 10.

Figure 22:
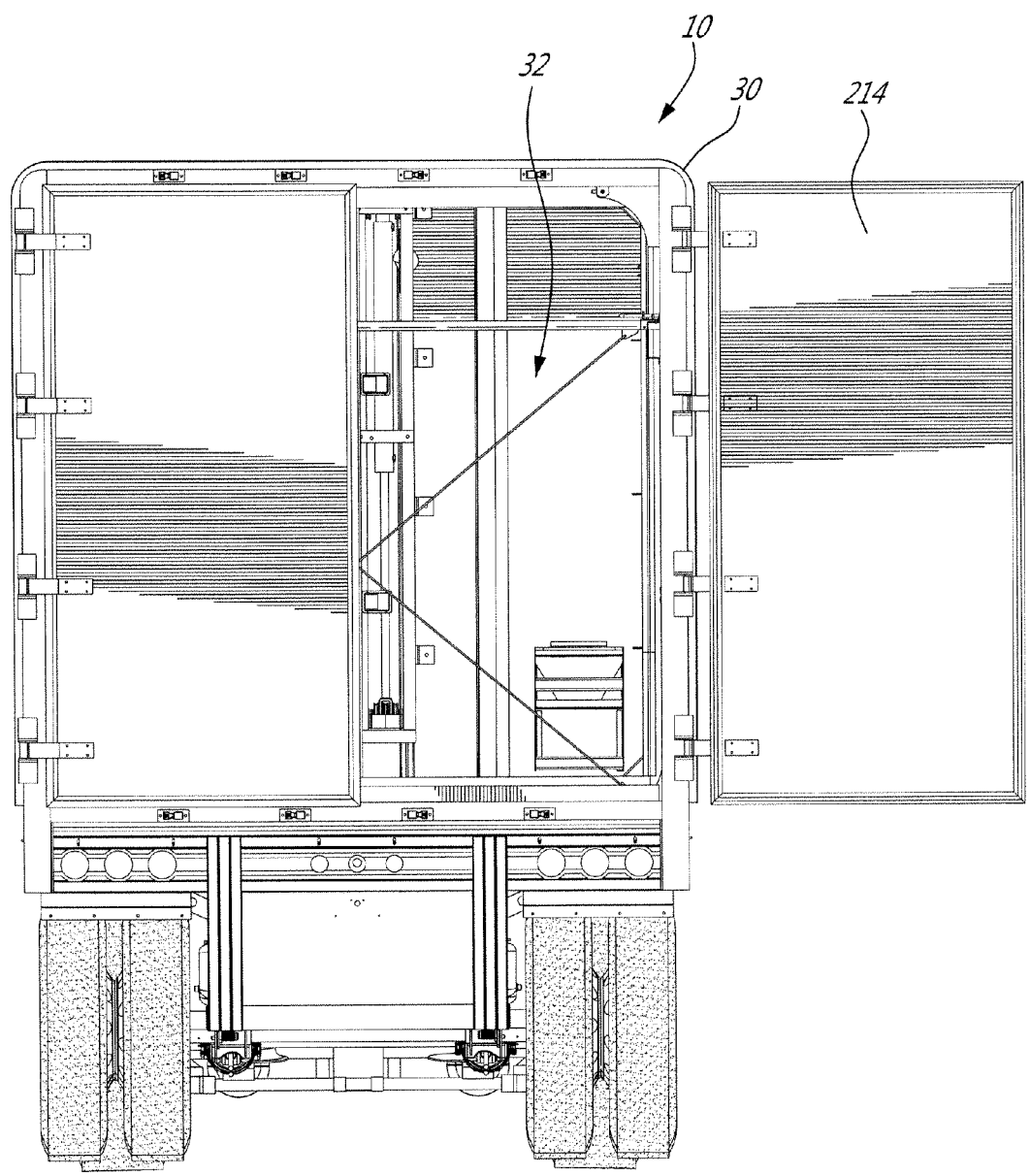
FIG. 22 is a rear end view of the semi-trailer of FIG. 1 with one door open.

FIG. 22, is a rear end view of the semi-trailer 10 where one of the doors 214 of the door assembly 30 is open. A door (not shown) of the storage compartment 32 is also open.

FIG. 23, on the other hand, shows both doors 214 of the door assembly 30 in their open position but where both doors 216 of the optional storage compartment 32 are closed.

One skilled in the art will understand that various elements such as the wall-support assemblies 28, the strengthening cables 140, cleaning tools and products (both not shown) can be stored in the compartment 32.

A possible sequence of operation to change the configuration of the semi-trailer from the dry-box configuration illustrated in FIG. 1 to the flat-bed configuration illustrated in FIG. 2 will now be described. Of course, the following steps are followed generally in reverse order should one desire to change the configuration of the semi-trailer from the flatbed configuration illustrated in FIG. 2 to the dry-box configuration illustrated in FIG. 1.

First, the cables 140 are removed from the deck 12, for example via the strengthening cable power releasing mechanism 142 (FIG. 13). This mechanism 142 is operated via the pneumatic commands of the tractor (not shown), the pneumatic output thereof being connected to the pneumatic inlets 194 of the semi-trailer 10. The wall-support assemblies 28 (FIG. 8) may then be removed from the wall structures 24 and 26, folded and stored, along with the cables 140, into the storage 30. The sliding bolts 105 (FIG. 6) may then be disengaged. Finally, the wall structures 24 and 26 may sequentially be moved from their upright to their lay down positions.

Turning now to FIG. 24 an alternate wall-support assembly 300 to interconnect the wall structures 24 and 26 will be described. The assembly 300 includes a telescoping assembly provided with a hollow tube 302, a sliding bar 304 and an extending mechanism 306 to force the bar 304 out of the tube 302 to maintain a desired relationship between the wall structures 24 and 26. The extending mechanism 306 may be, for example, a ratchet assembly that may be operated and locked by a lever 307.

The ends 308 (only one shown) includes a forked element 310 so configured as to be mounted to the free end of the wall structure.

It is to be noted that strengthening cables (not shown) could be used with the wall support assembly 300.

FIG. 24 also illustrates a removable cover assembly 312 that may be mounted to the wall structures 24 and 26 to provide a top wall of the semi-trailer 10.

Even though the semi-trailer 10 according to the illustrated embodiment of the present invention is a four-axle type semi-trailer, the number and position of the axles along the deck 12 may vary without departing from the spirit and nature of the present invention.

It is to be noted that many modifications could be made to the semi-trailer 10 described hereinabove and illustrated in the appended drawings. For example:

the road wheels 20 could be replaced by train wheels;
each of the wall structures 24 and 26 could be made of a single wall panel;
in some configurations of the wall structures 24 and 26, no overlapping is required and the bracket 52 is omitted, such an alternative configuration is for example when the sum of the heights of the wall structures 24 and 26 is less than the width of the deck 12;
each of the wall structures 24 and 26 could be replaced by multiple smaller wall structures independently movable via separate wall pivoting assemblies;
the separate levers 106 and 108 used to control the actuators could be replaced by an electronic circuit controlling the sequence of movement of the actuators;
the pneumatic actuators illustrated herein could be replaced by hydraulic actuators or linear motors, for example;
the wall pivoting mechanism 40 could be replaced by a mechanism using chains, sprockets and a conventional electric motor to move the wheeled base 64 along the hollow tube 52, for example;
the end wall pivoting mechanism 82 could be replaced by a mechanism using chains, sprockets and a conventional electric motor to move the bracket 94 along the post 86, for example;
depending on the length of the semi-trailer and of the size of the actuators 44, the generally centrally located wall pivoting mechanisms 40 can have enough power to single handedly move the wall structure without requiring the end wall pivoting mechanism 82;
more than one wall pivoting mechanisms 40 could be provided to move each wall structure;
alternatively, depending on the length of the semi-trailer and of the size of the actuators 86, the generally centrally located wall pivoting mechanism 40 could be omitted and the end wall pivoting mechanism 82 could be sufficient to pivot the wall structure; and
the removable archway 200 could be replaced by a fixed archway.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. A semi-trailer to be trailed by a tractor, the semi-trailer comprising:
a wheeled deck having two lateral sides, proximate and distal longitudinal end sides; and
two wall structures so pivotably mounted to the wheeled deck along a respective lateral side thereof as to be movable between an upright position, wherein the semi-trailer is in a dry-box configuration, and a lay down position wherein the semi-trailer is in a flatbed configuration; the two wall structures allowing the semi-trailer to be moved between the dry-box configuration and the flatbed configuration.

2. A semi-trailer as recited in claim 1, wherein the proximate longitudinal end includes a front storage compartment.

3. A semi-trailer as recited in claim 1, further comprising at least one wall-support assembly removably mountable between the two wall structures.

4. A semi-trailer as to be trailed by a tractor, the semi-trailer comprising:
a wheeled deck having two lateral sides, proximate and distal longitudinal end sides; and
two wall structures so pivotably mounted to the wheeled deck along a respective lateral side thereof as to be movable between an upright position, wherein the semi-trailer is in a dry-box configuration, and a lay down position wherein the semi-trailer is in a flatbed configuration; the two wall structures allowing the semi-trailer to be moved between the dry-box configuration and the flatbed configuration; further comprising at least one wall-support assembly removably mountable between the two wall structures; wherein the at least one wall-support assembly includes first and second rods interconnected by a pivot assembly so as to be movable between an extended position where the first and second rods are collinear and a folded position where the first and second rods are generally parallel.

5. A semi-trailer as recited in claim 4, wherein the at least one wall-support assembly includes a locking mechanism so configured as to releasably lock the first and second bars in the extended position.

6. A semi trailer as recited in claim 4, wherein opposite ends of the at least one wall-support assembly includes a circumferential channel defining a neck portion and a head portion, configured to interconnect with keyhole apertures of the two wall structures.

7. A semi-trailer to be trailed by a tractor, the semi-trailer comprising:
a wheeled deck having two lateral sides, proximate and distal longitudinal end sides; and two wall structures so pivotably mounted to the wheeled deck along a respective lateral side thereof as to be movable between an upright position, wherein the semi-trailer is in a dry-box configuration, and a lay down position wherein the semi-trailer is in a flatbed configuration; the two wall structures allowing the semi-trailer to be moved between the dry-box configuration and the flatbed configuration; further comprising at least one wall-support assembly removably mountable between the two wall structures; wherein the at least one wall-support assembly includes a telescoping assembly provided with a hollow tube, a sliding bar and an extending mechanism provided between the hollow tube and the sliding bar to force the bar out of the tube.

8. A semi-trailer as recited in claim 7, wherein opposite ends of the at least one wall-support assembly include forked elements configured and sized as to be mounted to the two wall structures.

9. A semi-trailer as recited in claim 3, wherein opposite ends of the at least one wall-support assembly are provided with strengthening cables having respective distal ends that may releasably be mounted to the wheeled deck.

10. A semi-trailer as recited in claim 9, wherein each of the distal ends of the strengthening cables is mounted to the wheeled deck via a power releasing mechanism including an actuator allowing the remote release of the cable from the wheeled deck.

11. A semi-trailer as recited in claim 9, wherein the power releasing mechanism includes an indicator that indicates the locking state of the mechanism.

12. A semi-trailer as recited in claim 1, further comprising, for each wall structure, a wall pivoting mechanism so provided between the wheeled deck and the wall structure; the wall pivoting mechanism being so configured as to move the wall structure between the upright position and the lay down position.

13. A semi-trailer as recited in claim 12, wherein the wall pivoting mechanism includes a wall mounting assembly and an actuator.

14. A semi-trailer as recited in claim 13, wherein the wall mounting assembly includes a connecting element having a first end pivotally connected to the wall structure and a second end pivotally connected to a moving portion of the actuator.

15. A semi-trailer as recited in claim 13, wherein the actuator is provided with a longitudinally movable piston so mounted to the wheeled deck as to define an angle therewith; the wall mounting assembly includes a hollow tube collinear with the movable piston, a wheeled base longitudinally movable in the hollow tube and connected to the piston and a connecting element having a first end pivotally connected to the wall structure and a second end pivotally connected to the wheeled base.

16. A semi-trailer as recited in claim 13, wherein the actuator is selected from the group consisting of a pneumatic actuator, a hydraulic actuator and a linear motor.

17. A semi-trailer as recited in claim 12, further comprising, for at least one end of each of the two wall structures, an end wall pivoting mechanism so provided between the wheeled deck and the wall structure; the wall pivoting mechanism being so configured as to move the wall structure between the upright position and the lay down position.

18. A semi-trailer to be trailed by a tractor, the semi-trailer comprising:
a wheeled deck having two lateral sides, proximate and distal longitudinal end sides; and
two wall structures so pivotably mounted to the wheeled deck along a respective lateral side thereof as to be movable between an upright position, wherein the semi-trailer is in a dry-box configuration, and a lay down position wherein the semi-trailer is in a flatbed configuration; the two wall structures allowing the semi-trailer to be moved between the dry-box configuration and the flatbed configuration:
further comprising:
for each wall structure, a wall pivoting mechanism so provided between the wheeled deck and the wall structure; the wall pivoting mechanism being so configured as to move the wall structure between the upright position and the lay down position;
for at least one end of each of the two wall structures, an end wall pivoting mechanism so provided between the wheeled deck and the wall structure; the wall pivoting mechanism being so configured as to move the wall structure between the upright position and the lay down position; wherein the end wall pivoting mechanism includes:
a movable bracket so mounted to the semi-trailer as to longitudinally move in a direction generally perpendicular to the wheeled deck;
a link arm having a first end pivotally connected to the bracket and a second end pivotally connected to a wall structure; and
an actuator so configured as to move the bracket in the direction generally perpendicular to the wheeled deck.

19. A semi-trailer as recited in claim 18, wherein the actuator is selected from the group consisting of a pneumatic actuator, a hydraulic actuator and a linear motor.

20. A semi-trailer as recited in claim 1, further comprising, for at least one end of each of the two wall structures, an end wall pivoting mechanism so provided between the wheeled deck and the wall structure; the wall pivoting mechanism being so configured as to move the wall structure between the upright position and the lay down position.

21. A semi-trailer to be trailed by a tractor, the semi-trailer comprising:
a wheeled deck having two lateral sides, proximate and distal longitudinal end sides; and
two wall structures so pivotably mounted to the wheeled deck along a respective lateral side thereof as to be movable between an upright position, wherein the semi-trailer is in a dry-box configuration, and a lay down position wherein the semi-trailer is in a flatbed configuration; the two wall structures allowing the semi-trailer to be moved between the dry-box configuration and the flatbed configuration; further comprising, for at least one end of each of the two wall structures, an end wall pivoting mechanism so provided between the wheeled deck and the wall structure; the wall pivoting mechanism being so configured as to move the wall structure between the upright position and the lay down position;
wherein the end wall pivoting mechanism includes:
a movable bracket so mounted to the semi-trailer as to longitudinally move in a direction generally perpendicular to the wheeled deck;
a link arm having a first end pivotally connected to the bracket and a second end pivotally connected to a wall structure; and
an actuator so configured as to move the bracket in the direction generally perpendicular to the wheeled deck.

22. A semi-trailer as recited in claim 21, wherein the actuator is selected from the group consisting of a pneumatic actuator, a hydraulic actuator and a linear motor.

23. A semi-trailer as recited in claim 1, wherein the two wall structures are pivotally mounted to a respective lateral side of the wheeled deck by respective hinge assemblies.

24. A semi-trailer as recited in claim 23, wherein one of the two hinge assembly is mounted to a bracket elevating the hinge assembly above the wheeled deck to allow the associated wall structure to overlap the other wall structure when both wall structures are in the lay down position.

25. A semi-trailer as recited in claim 1, wherein the distal longitudinal end includes a rear door assembly.

26. A semi-trailer as recited in claim 25, wherein the rear door assembly includes a removable top portion.

27. A semi-trailer to be trailed by a tractor, the semi-trailer comprising:
a wheeled deck having two lateral sides, proximate and distal longitudinal end sides; and
two wall structures so pivotably mounted to the wheeled deck along a respective lateral side thereof as to be movable between an upright position, wherein the semi-trailer is in a dry-box configuration, and a lay down position wherein the semi-trailer is in a flatbed configuration; the two wall structures allowing the semi-trailer to be moved between the dry-box configuration and the flatbed configuration; wherein the distal longitudinal end includes a rear door assembly including first and second doors pivotally mounted to studs and a pivotable archway.

28. A semi-trailer to be trailed by a tractor, the semi-trailer comprising:
a wheeled deck having two lateral sides, proximate and distal longitudinal end sides; and
two wall structures so pivotably mounted to the wheeled deck along a respective lateral side thereof as to be movable between an upright position, wherein the semi-trailer is in a dry-box configuration, and a lay down position wherein the semi-trailer is in a flatbed configuration; the two wall structures allowing the semi-trailer to be moved between the dry-box configuration and the flatbed configuration; wherein the distal longitudinal end includes a rear door assembly including a removable step.

29. A semi-trailer as recited in claim 28, wherein the door assembly includes an actuator so configured as to move the removable step to facilitate removal thereof from the door assembly.

30. A semi-trailer as recited in claim 1, further comprising sliding bolts removably locking the two wall structures in the upright positions.

31. A semi-trailer as recited in claim 1, further comprising a removable cover assembly.

32. A semi-trailer as recited in claim 1, wherein each of the two wall structures are made of at least two wall panels interconnected together.

33. A semi-trailer as recited in claim 32, wherein the at least two wall panels are interconnected using elements selected from the group consisting of tongue and groove cooperating arrangement, U-shaped channels, mounting brackets and fasteners.

34. A semi-trailer to be trailed by a tractor, the semi-trailer comprising:
a wheeled deck having two lateral sides, proximate and distal longitudinal end sides;
two wall structures so mounted to the wheeled deck along a respective lateral side thereof as to be pivotable between an upright position and a lay down position; and
means for pivoting the two wall structures between the upright position and the lay down position.

35. A semi-trailer to be trailed by a tractor, the semi-trailer comprising:
a wheeled deck having two lateral sides, proximate and distal longitudinal end sides; a door assembly provided at the distal longitudinal end side and a storage compartment provided at the proximate longitudinal end side;
two wall structures so mounted to the wheeled deck along a respective lateral side thereof via hinges as to be pivotable between an upright position and a lay down position;
at least one wall-support assembly removably mountable between the two wall structures; the at least one wall-support assembly being provided strengthening cables having respective distal ends that may releasably be mounted to the wheeled deck via a power releasing mechanism including an actuator allowing the remote release of the cable from the wheeled deck;
for each wall structure:
a wall pivoting mechanism provided between the wall structure and the wheeled deck to move the wall structure between the upright position and the lay down position; the wall pivoting mechanism including a wall mounting assembly and an actuator; and
an end wall pivoting mechanism provided between the wall structure and the wheeled deck to move the wall structure between the upright position and the lay down position.

* * * * *